(12) United States Patent
Bayyouk et al.

(10) Patent No.: US 12,044,339 B2
(45) Date of Patent: Jul. 23, 2024

(54) FLOWLINE QUICK CONNECTOR ASSEMBLY

(71) Applicant: SPM Oil & Gas Inc., Fort Worth, TX (US)

(72) Inventors: Jacob Bayyouk, Richardson, TX (US); Emma Henderson, Glasgow (GB); Phillip Richard Damian Agius, West Lothian (GB)

(73) Assignee: SPM Oil & Gas Inc., Fort Worth, TX (US)

( * ) Notice: Subject to any disclaimer, the term of this patent is extended or adjusted under 35 U.S.C. 154(b) by 17 days.

(21) Appl. No.: 17/807,997

(22) Filed: Jun. 21, 2022

(65) Prior Publication Data
US 2023/0008143 A1 Jan. 12, 2023

Related U.S. Application Data

(60) Provisional application No. 63/220,968, filed on Jul. 12, 2021.

(51) Int. Cl.
*F16L 19/02* (2006.01)
*F16L 23/04* (2006.01)
(Continued)

(52) U.S. Cl.
CPC ....... *F16L 19/0206* (2013.01); *F16L 19/0218* (2013.01); *F16L 23/04* (2013.01);
(Continued)

(58) Field of Classification Search
CPC ...... F16L 19/025; F16L 19/005; E21B 17/043
See application file for complete search history.

(56) References Cited

U.S. PATENT DOCUMENTS 1,089,650 A * 3/1914 Kile ...................... F16L 19/005
285/361
4,802,695 A * 2/1989 Weinhold .............. F16L 19/005
285/91
(Continued)

FOREIGN PATENT DOCUMENTS

CN 111963091 A 11/2020
DE 20208081 U1 * 9/2002 ............ F16L 19/005
(Continued)

*Primary Examiner* — Matthew Troutman
*Assistant Examiner* — Fannie C Kee
(74) *Attorney, Agent, or Firm* — Harrity & Harrity, LLP

(57) ABSTRACT

In some implementations, a flowline connector assembly may include a first flowline member having a first cylindrical passageway, and a second flowline member having a second cylindrical passageway. The flowline connector assembly may include a pin, configured to be inserted into the first cylindrical passageway and the second cylindrical passageway, including a stop extending radially outward from an outer surface of the pin, where a first side of the stop is configured to contact a face of the first flowline member when the pin is inserted into the first cylindrical passageway. The flowline connector assembly may include a collar configured for threaded engagement at a first end with an outer surface of the first flowline member, wherein an inner surface of the collar is configured to contact a second side of the stop to connect the first flowline member with the second flowline member.

20 Claims, 15 Drawing Sheets

(51) Int. Cl.
  *F16L 23/08* (2006.01)
  *F16L 23/22* (2006.01)
  *F16L 37/62* (2006.01)

(52) U.S. Cl.
  CPC ............ *F16L 23/08* (2013.01); *F16L 23/22* (2013.01); *F16L 37/62* (2013.01)

(56) References Cited

U.S. PATENT DOCUMENTS

| | | | | |
|---|---|---|---|---|
| 4,927,187 | A | * | 5/1990 | Sanford ............... F16L 19/005 285/330 |
| 5,016,920 | A | * | 5/1991 | Anderson ............ F16L 19/005 285/39 |
| 5,060,988 | A | * | 10/1991 | Williamson .......... F16L 19/025 285/354 |
| 6,860,525 | B2 | | 3/2005 | Parks |
| 8,857,863 | B1 | * | 10/2014 | Patin ..................... F16L 19/025 285/38 |
| 9,850,745 | B2 | | 12/2017 | Delgado et al. |
| 10,767,434 | B2 | | 9/2020 | Andueza |
| 10,822,887 | B2 | | 11/2020 | Persent et al. |
| 2019/0360624 | A1 | | 11/2019 | Waller |
| 2021/0062617 | A1 | | 3/2021 | Pillai et al. |

FOREIGN PATENT DOCUMENTS

| | | | | |
|---|---|---|---|---|
| FR | 2831640 A1 | * | 5/2003 | ............ F16L 19/025 |
| KR | 101723372 B1 | * | 4/2017 | ............ E21B 17/043 |
| WO | WO-2015185882 A1 | * | 12/2015 | ............ F16L 19/025 |
| WO | WO-2018057949 A1 | * | 3/2018 | ............ E21B 17/043 |

* cited by examiner

FLOWLINE QUICK CONNECTOR ASSEMBLY

CROSS-REFERENCE TO RELATED APPLICATION

This patent application claims priority to U.S. Provisional Patent Application No. 63/220,968, filed on Jul. 12, 2021, and entitled "FLOWLINE IRON QUICK CONNECTOR." The disclosure of the prior application is considered part of and is incorporated by reference into this patent application.

TECHNICAL FIELD

The present disclosure relates generally to pipe connectors and, for example, to a flowline quick connector assembly.

BACKGROUND

In some oil field service operations, such as hydraulic fracturing, cementing, concrete pouring, well service, and/or acidizing, among other examples, fluids may be pumped at high pressure down a well. In some cases, the fluid pressures may be in excess of 15,000 pounds per square inch (PSI). Typically, high pressure pumping equipment may be transported to a well site and temporary service flowlines may be installed from the high-pressure pumping equipment to a wellhead. Because high volumes of fluid may also be needed, a number of pumping units may be connected together at one well site using a number of flowlines.

The flowline components may include joints or sections of steel pipe of differing lengths, and including various junctions, valves, and/or swivels, among other examples. Generally, because the equipment configuration is different at each site, operators have to customize and connect the various components and flowline to extend around a variety of well site equipment. A given equipment configuration may include multiple connections, and each connection must be able to withstand the high-pressure fluids flowing in the flowlines. The operators need to be able to quickly make and break out the connections to minimize the time needed for each job.

The larger size flowlines used on oil well sites may be large and/or heavy and may require a crane or other equipment to lift and maneuver the flowlines to achieve proper alignment when establishing a connection between two flowlines or other equipment. This process typically involves a team of operators who must exert a large amount of energy to maneuver the flowlines and/or equipment into place and achieve alignment. For example, flowlines are typically connected via flanged connectors. The flanged connectors may be secured together with, for example, sixteen bolts that must all be in alignment and then tightened in a particular sequence to establish a proper connection. The flanged connectors also commonly incorporate an annular seal disposed in a groove at the interface between the two flanges. This seal often falls out of the groove and may become damaged during installation. The task of connecting the conventional flowline components is thus inefficient, physically taxing, and time-consuming.

The flowline quick connector assembly of the present disclosure solves one or more of the problems set forth above and/or other problems in the art.

SUMMARY

In some implementations, a flowline connector assembly includes: a first flowline member having an annular configuration defining a first cylindrical passageway; a second flowline member having an annular configuration defining a second cylindrical passageway; a pin including a stop extending radially outward from an outer surface of the pin, wherein the pin is configured to be inserted into the first cylindrical passageway and the second cylindrical passageway, and wherein a first side of the stop is configured to contact a face of the first flowline member when the pin is inserted into the first cylindrical passageway; and a collar having a first inner diameter at a first end of the collar and a second inner diameter at a second end of the collar, wherein the first inner diameter is greater than the second inner diameter, wherein the collar is configured for threaded engagement at the first end with an outer surface of the first flowline member, and wherein an inner surface of the collar at the second end is configured to contact a second side of the stop to connect the first flowline member with the second flowline member.

In some implementations, a flowline connector for connecting a first flowline member and a second flowline member includes a pin having an annular configuration, wherein the pin includes a stop extending radially outward from an outer surface of the pin, wherein the pin is configured to be inserted into the first flowline member, wherein the pin is engaged with the second flowline member, and wherein a first side of the stop is configured to contact a face of the first flowline member when the pin is inserted into the first flowline member; and a collar having a first inner diameter at a first end of the collar and a second inner diameter at a second end of the collar, wherein the collar is configured for threaded engagement at the first end with an outer surface of the first flowline member, and wherein an inner surface of the collar at the second end is configured to contact a second side of the stop to connect the first flowline member with the second flowline member.

In some implementations, a flowline system includes a first flowline having a cylindrical body and a first flowline member; a second flowline having a cylindrical body and a second flowline member; and a flowline connector for connecting the first flowline and the second flowline, the flowline connector including: a pin including a stop extending radially outward from an outer surface of the pin, wherein the pin is configured to be inserted into a first cylindrical passageway of the first flowline member and a second cylindrical passageway of the second flowline member, and wherein the pin is integrally connected to the second cylindrical passageway of the second flowline member; and a collar having a first inner diameter at a first end of the collar and a second inner diameter at a second end of the collar, wherein the first inner diameter is greater than the second inner diameter, wherein the collar is configured for threaded engagement at the first end with an outer surface of the first flowline member, and wherein an inner surface of the collar at the second end is configured to contact a first side of the stop to connect the first flowline with the second flowline.

DETAILED DESCRIPTION

This disclosure relates to a flowline connector assembly 200, which is applicable to any machine or system that includes connections between flowlines (e.g., flowline irons), such as high-pressure large-bore flowline irons. Large bore flowlines may have an inside diameter (ID) of five inches and larger (e.g., 5+ inches). For example, the machine or system be an oil well system, a hydraulic fracturing system, a well-stimulation system, a fluid flowline system, and/or other machines or systems.

Figure 1:
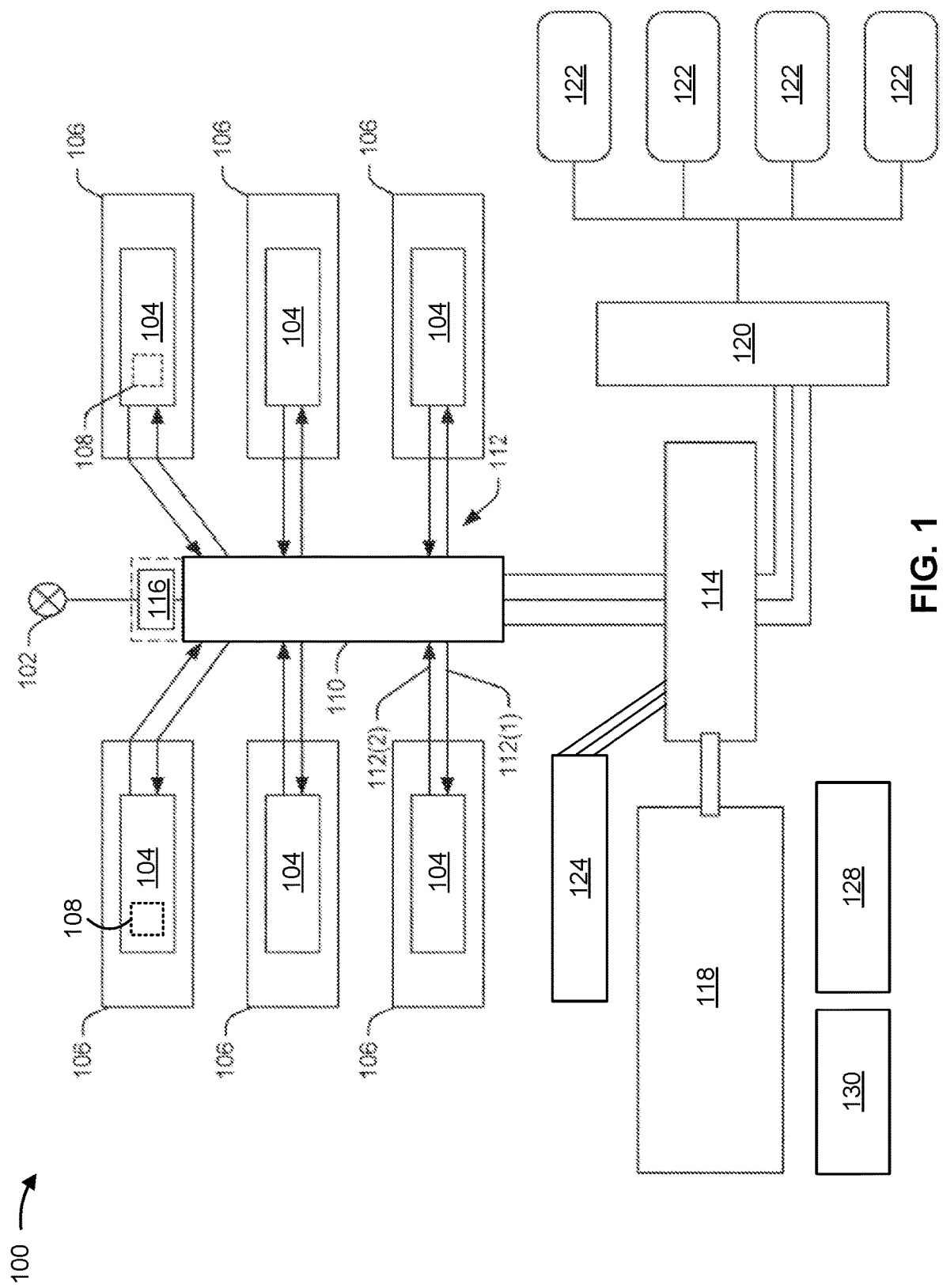
FIG. 1 is a diagram of an example flowline system described herein.

FIG. 1 is a diagram of an example flowline system 100 described herein. For example, FIG. 1 depicts a plan view of an example flowline system site along with equipment that is used during a hydraulic fracturing process. In some examples, less equipment, additional equipment, or alternative equipment to the example equipment depicted in FIG. 1 may be used to conduct the hydraulic fracturing process. The flowline system 100 includes a well 102. High-pressure injection of the fracturing fluid may be achieved by one or more pump systems 104 that may be mounted (or housed) on one or more hydraulic fracturing skids 106 (which also may be referred to as "hydraulic fracturing rigs") of the flowline system 100. In some examples, the one or more pump systems 104 may be mounted (or housed) on one or more trailers. Each of the pump systems 104 includes at least one fluid pump 108 (referred to herein collectively, as "fluid pumps 108" and individually as "a fluid pump 108"). The fluid pumps 108 may be hydraulic fracturing pumps. The fluid pumps 108 may be positive displacement pumps. The fluid pumps 108 may include various types of high-volume hydraulic fracturing pumps such as triplex or quintuplex pumps. Additionally, or alternatively, the fluid pumps 108 may include other types of reciprocating positive-displacement pumps or gear pumps.

Although some examples described herein associate the flowline system 100 as part of a hydraulic fracturing (or "frac") system, which may be used to facilitate oil and gas exploration and production operations, the embodiments provided herein are not limited to a hydraulic fracturing system. For example, the embodiments may be used with, or adapted to, a mud pump system, a well treatment system, other pumping systems, and/or other flowline systems.

In some examples, the fluid pumps 108 may be in fluid communication with a manifold 110 via various flowlines 112, such as fluid conduits, pipes, or other types of fluid conduits. As described in more detail elsewhere the flowlines 112 may be connected via a flowline connector assembly 200. The manifold 110 combines fluid received from the fluid pumps 108 prior to injecting the fracturing fluid into the well 102. The manifold 110 also distributes fluid to the fluid pumps 108 that the manifold 110 receives from a blender 114 of the flowline system 100. In some examples, the various fluids are transferred between the various components of the flowline system 100 via the flowlines 112. The flowlines 112 include low-pressure flowlines 112(1) and high-pressure flowlines 112(2). In some examples, the low-pressure flowlines 112(1) deliver fluid from the manifold 110 to the fluid pumps 108, and the high-pressure flowlines 112(2) transfer high-pressure fluid from the fluid pumps 108 to the manifold 110.

The manifold 110 also includes a fracturing head 116. The fracturing head 116 may be included on a same support structure as the manifold 110. The fracturing head 116 receives fracturing fluid from the manifold 110 and delivers the fracturing fluid to the well 102 (via a well head mounted on the well 102) during a hydraulic fracturing process. The fluid pumps 108, the flowlines 112, the manifold 110, and/or the fracturing head 116 may define a fluid system of the flowline system 100.

The blender 114 combines proppant received from a proppant storage unit 118 with fluid received from a hydration unit 120 of the flowline system 100. In some examples, the proppant storage unit 118 may include a dump truck, a truck with a trailer, one or more silos, or other type of containers. The hydration unit 120 receives water from one or more water tanks 122. In some examples, the flowline system 100 may receive water from water pits, water trucks, water lines, and/or any other suitable source of water. The hydration unit 120 may include one or more tanks, pumps, gates, or the like. The flowline system 100 may include one or more fluid additive storage units 124 that store fluid additives. The fluid additive storage unit 124 may be in fluid communication with the hydration unit 120 and/or the blender 114 to add fluid additives to the fluid.

The flowline system 100 may include a data monitoring system 128. The data monitoring system 128 may manage and/or monitor a process performed by the flowline system 100 and the equipment used in the process. In some examples, the management and/or monitoring operations may be performed from multiple locations. The data monitoring system 128 may be supported on a van, a truck, or may be otherwise mobile. The flowline system 100 may include a controller 130. The controller 130 is in communication (e.g., by a wired connection or a wireless connection) with the pump systems 104 of the skids 106.

As indicated above, FIG. 1 is provided as an example. Other examples may differ from what is described with regard to FIG. 1.

Figure 2:
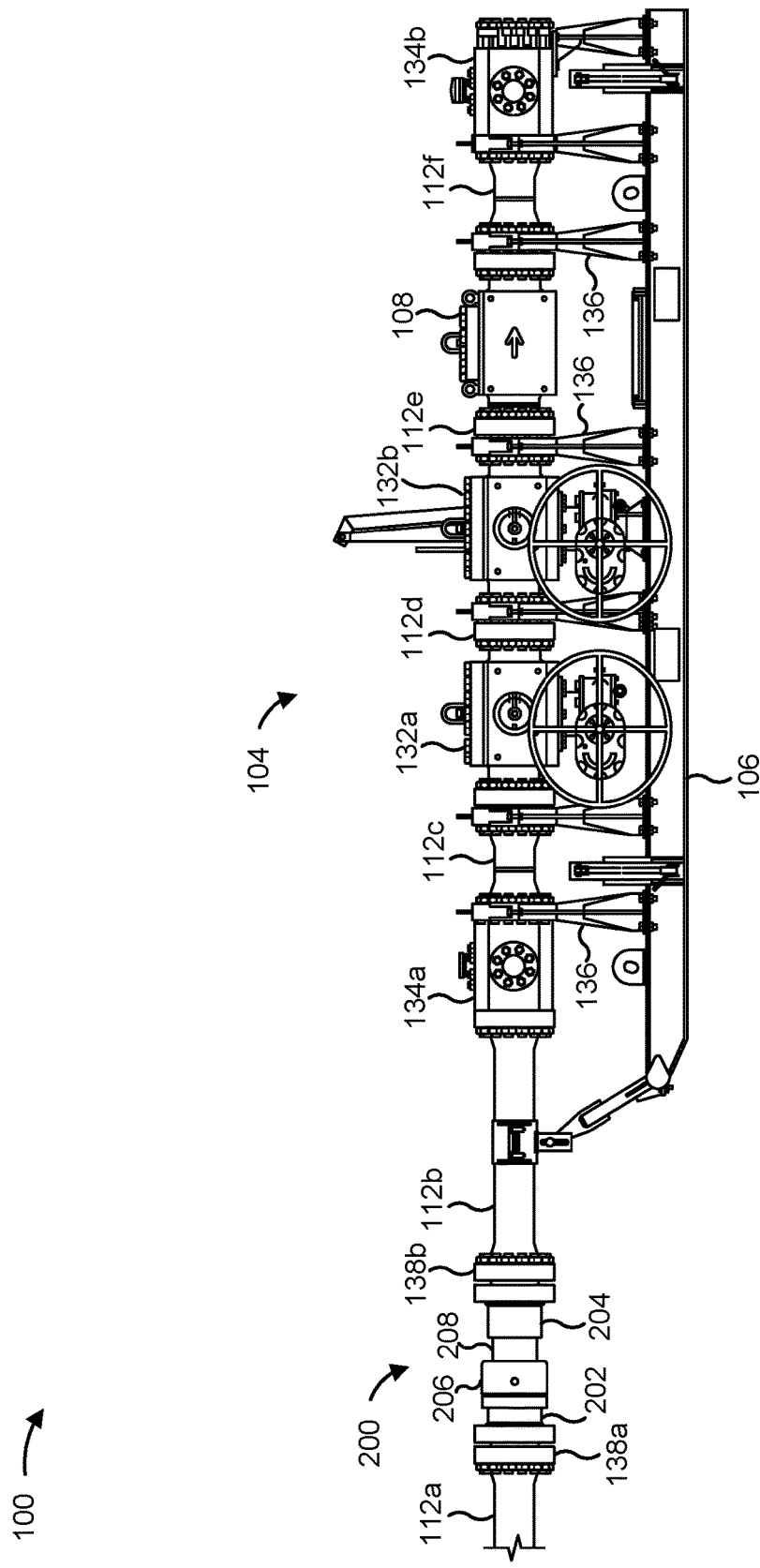
FIG. 2 is a diagram of an example pump system described herein.

FIG. 2 is a diagram of an example pump system 104 described herein. As shown in FIG. 2, the flowline connector assembly 200 may connect a first flowline 112a to a second flowline 112b of the pump system 104. The flowline connector assembly 200 may connect two flowlines 112 of other systems or devices in a similar manner as described herein.

As shown in FIG. 2, the pump system 104 may be mounted on a skid 106. The pump system 104 may include one or more fluid pumps 108, one or more valves 132 (e.g., valve 132a and valve 132b), and/or one or more fluid blocks 134 (e.g., fluid block 134a and fluid block 134b), among other examples. The one or more fluid pumps 108, one or more valves 132, and/or one or more fluid blocks 134 may be connected via flowlines 112 (e.g., flowlines 112c-112f). The fluid blocks 134, the flowlines 112, the pumps 108, and the valves 132 are connected to each other in series and supported in an elevated position above the skid 106 by vertical supports 136. In some implementations, the valves 132 are plug valves (e.g., the valve 132a may be a manual plug valve, and the valve 132b may be an automatic plug valve). In some implementations, the valve 132a and/or the valve 132b may be a check valve.

The pump system 104 may be connected to other systems or devices of the flowline system 100 via the flowline 112b and the flowline 112a. For example, the flowline 112b may extend from the pump system 104 and the skid 106. The flowline 112b may provide a route for fluid to the other systems or devices of the flowline system 100. As shown in FIG. 2, the flowline 112a may include a flange 138a and the flowline 112b may include a flange 138b. Previously, the flowline 112b may be connected to the flowline 112a by aligning through holes in the flanges 138a and 138b to allow for the flanges 138a and 138b to be bolted together. However, this requires multiple through holes (e.g., up to 16 through holes in some cases) to be aligned. Additionally, this may require the pump system 104 to be lifted (e.g., by a crane or other device) so that the flowline 112b can be moved to be aligned with the flowline 112a (e.g., by one or more operators), resulting in a physically taxing and time-consuming connection procedure.

The flowline connector assembly 200 eases the burden of the connection procedure by enabling a first flowline member 202 and a second flowline member 204 to be connected via a collar 206 and/or a pin 208. Because the components of the flowline connector assembly 200 may be smaller and/or more easily manipulated or moved, the connection procedure of connecting the flowline 112a to the flowline 112b may be less physically taxing and/or time-consuming. Additionally, through holes for a bolted connection may not need to be aligned during the connection procedure, reducing the physical effort and/or time needed to complete the connection procedure. Further, as shown in FIG. 2, the flowline connector assembly 200 enables flowline components to be connected in a horizontal configuration, rather than in a vertical configuration (e.g., as a vertical configuration may not be possible due to a length, size, and/or weight of the flowline components).

As indicated above, FIG. 2 is provided as an example. Other examples may differ from what is described with regard to FIG. 2.

Figure 3:
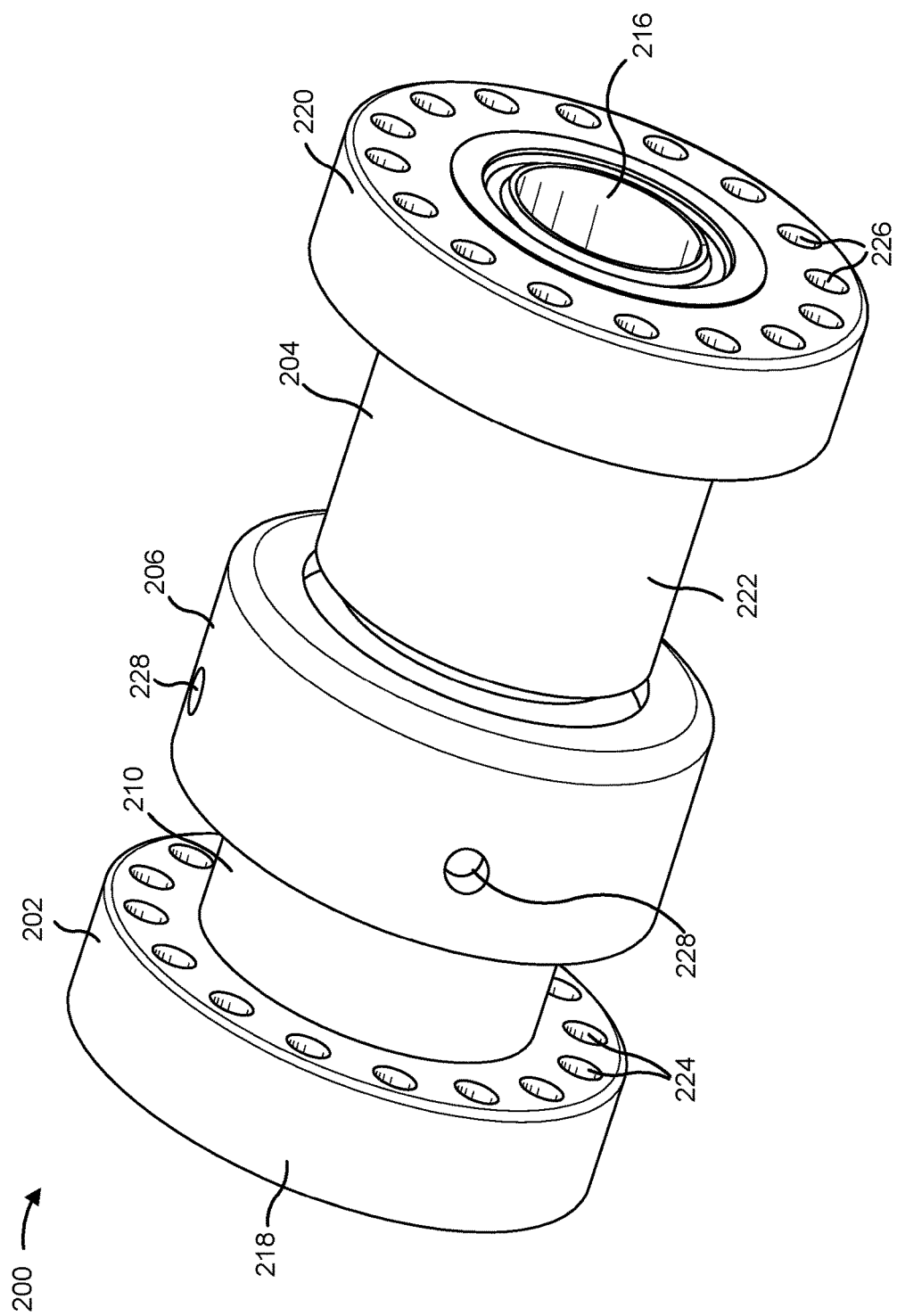
FIG. 3 is a diagram of a perspective view of an example flowline connector assembly described herein.

FIG. 3 is a diagram of a perspective view of an example flowline connector assembly 200 described herein. FIG. 3 depicts an example in which the collar 206 is connected to the first flowline member 202 via a threaded connection. For example, an outer surface 210 of the first flowline member 202 may include external threads (e.g., male threads). An inner surface 212 (not shown in FIG. 3) of the collar 206 may include internal threads (e.g., female threads) that are configured to create a threaded connection with the external threads (e.g., male threads) on an outer surface of the first flowline member 202.

The first flowline member 202 may have an annular configuration (e.g., a tubular configuration). Similarly, the second flowline member 204 may have an annular configuration (e.g., a tubular configuration). For example, the first flowline member 202 may include a first cylindrical passageway 214 (not shown in FIG. 3) defined by the annular configuration. Similarly, the second flowline member 204 may include a second cylindrical passageway 216 defined by the annular configuration. The first cylindrical passageway 214 and the second cylindrical passageway 216 (e.g., and the pin 208, not shown in FIG. 3) may define a fluid passageway between the first flowline 112a and the second flowline 112b.

The first flowline member 202 may include a flange 218. The flange 218 may have a diameter that is greater than a diameter of the outer surface 210 of the first flowline member 202. Similarly, the second flowline member 204 may include a flange 220. The flange 220 may have a diameter that is greater than a diameter of the outer surface 222 of the second flowline member 204. The flange 218 and/or the flange 220 may facilitate a connection to the first flowline 112a and/or the second flowline 112b. For example, the first flowline member 202 may be connected to the flowline 112a via a bolted connection between the flange 218 and the flange 138a (e.g., one or more bolts passing through the through holes 224 in the flange 218). Similarly, the second flowline member 204 may be connected to the flowline 112b via a bolted connection between the flange 220 and the flange 138a (e.g., one or more bolts passing through the through holes 226 in the flange 220).

Alternatively, the first flowline member 202 and/or the second flowline member 204 may not include a flange. For example, the first flowline member 202 may extend directly from the flowline 112a or another component (such as a fluid pump 108, a valve 132, or a fluid block 134, among other examples) without a bolted connection. For example, the first flowline member 202 may be part of the flowline 112a or the other component and/or may be welded to the flowline 112a or the other component. Additionally, or alternatively, the second flowline member 204 may extend directly from the flowline 112b or another component (such as a fluid pump 108, a valve 132, or a fluid block 134, among other examples) without a bolted connection. For example, the second flowline member 204 may be part of the flowline 112b or the other component and/or may be welded to the flowline 112b or the other component.

The collar 206 may include one or more apertures 228. The one or more apertures 228 may extend through a body of the collar 206 (e.g., the one or more apertures 228 may be openings in the collar 206). The one or more apertures 228 may be configured for receiving a tool to facilitate the collar 206 being threaded onto the first flowline member 202. For example, the tool may be inserted into an aperture 228 to facilitate turning the collar 206 to engage the threads of the collar 206 and the first flowline member 202. Additionally, or alternatively, the one or more apertures 228 may be configured for receiving an anti-rotation pin or screw to prevent a rotation of the collar 206. For example, once the collar 206 is threaded onto the first flowline member 202, an anti-rotation pin or screw (e.g., a set screw or another device) may be inserted into an aperture 228 to prevent a rotation of the collar 206 (e.g., to prevent the collar 206 from being disengaged from the first flowline member 202).

As indicated above, FIG. 3 is provided as an example. Other examples may differ from what is described with regard to FIG. 3.

Figure 4:
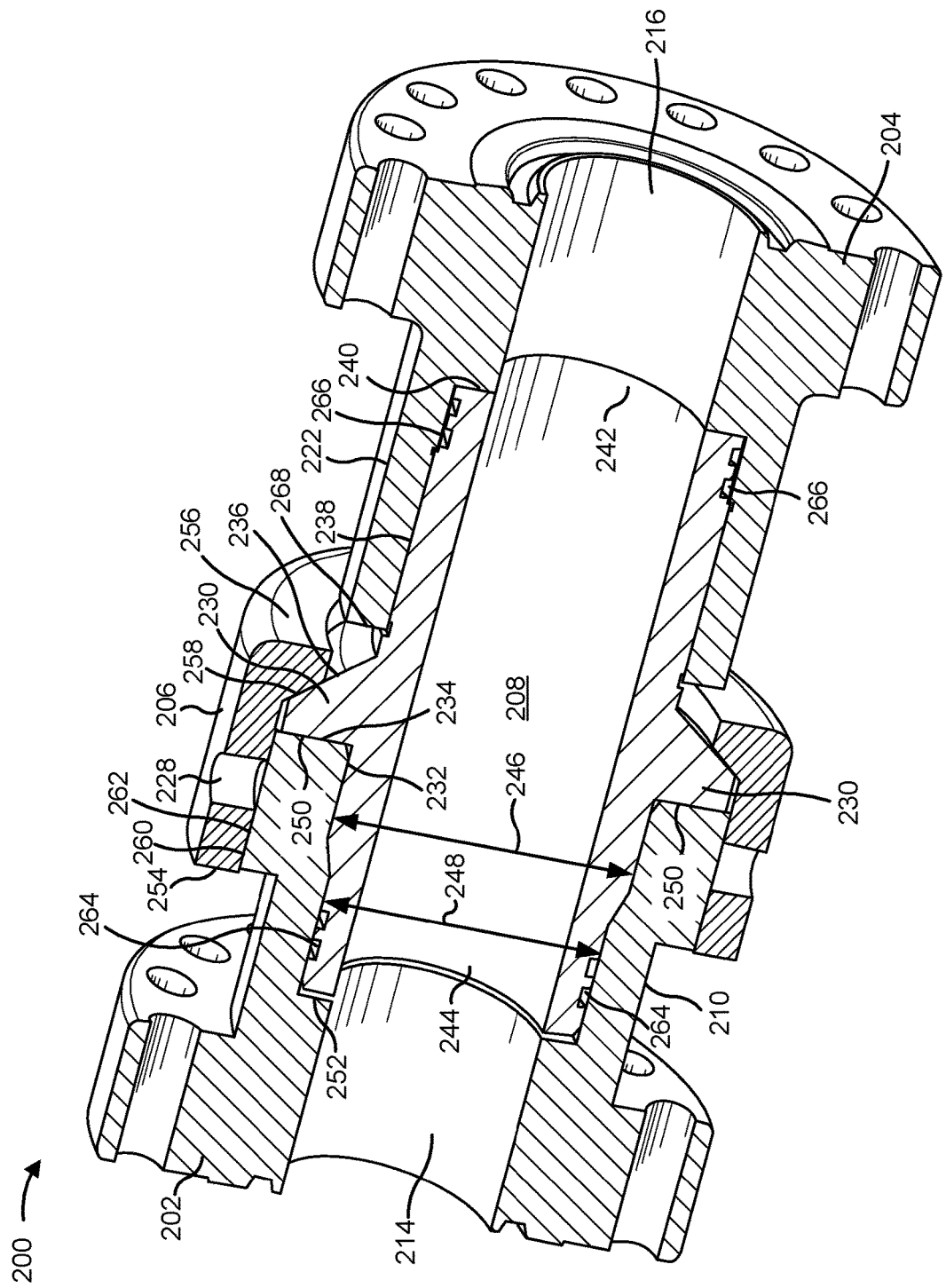
FIG. 4 is a diagram of a cross-section view of the example flowline connector assembly described herein.

FIG. 4 is a diagram of a cross-section view of the example flowline connector assembly 200 described herein. As shown in FIG. 4, the first cylindrical passageway 214, the second cylindrical passageway 216 and the pin 208 may define a fluid passageway between the first flowline 112a and the second flowline 112b. For example, the pin 208 may be an annular configuration. For example, the pin 208 may have a tubular and/or cylindrical body.

The pin 208 may include a stop 230 extending radially outward from an outer surface 232 of the pin 208. The stop 230 may include a first side 234 and a second side 236. The second side 236 of the stop 230 may be a tapered surface extending from outer surface 232 of the pin 208. For example, an angle between the second side 236 of the stop 230 and the outer surface 232 may be greater than 90 degrees. In other words, the second side 236 of the stop 230 may be tapered toward the first side 234 (e.g., the stop 230 may be wider at a base of the stop 230 near the outer surface 232 of the pin 208 than at a top of the stop 230). In some other cases, the second side 236 may have a different orientation. For example, the second side 236 may be perpendicular to the outer surface 232 of the pin 208. The first side 234 of the stop 230 may be perpendicular to the outer surface 232 of the pin 208. In some other cases, the first side 234 of the stop 230 may be tapered.

The pin 208 may be engaged with the second cylindrical passageway 216. For example, the outer surface 232 may be engaged with an inner surface 238 of the second cylindrical passageway 216 and/or the second flowline member 204. For example, the pin 208 may be engaged with the second cylindrical passageway 216 and/or the second flowline member 204 via a threaded engagement, a welded engagement, and/or an integral engagement, among other examples. In other words, the pin 208 may be integrally connected to the second cylindrical passageway 216 of the second flowline member 204. "Integrally connected" may refer to a connection that is permanent (such as a welded engagement) or semi-permanent (such as a threaded engagement, or a bolted engagement, among other examples). For example, the inner surface 238 of the second cylindrical passageway 216 may include internal threads (e.g., female threads) that are configured to create a threaded connection with external threads (e.g., male threads) on the outer surface 232 of the pin 208.

The second flowline member 204 and/or the second cylindrical passageway 216 may include a seat 240. For example, the second flowline member 204 and/or the second cylindrical passageway 216 may include a first portion having a first inner diameter and a second portion having a second inner diameter (e.g., where the first inner diameter is less than the second inner diameter). The first inner diameter may be the same as (or within a tolerance) of the inner diameter of the pin 208. The second inner diameter may be slightly larger (e.g., within a tolerance or threshold amount) of the outer diameter of the pin 208. When the pin 208 is inserted into the second flowline member 204 and/or the second cylindrical passageway 216, a first end 242 of the pin may contact the seat 240 to securely engage the pin 208 within the second flowline member 204.

The pin 208 may also be inserted into the first flowline member 202 and/or the first cylindrical passageway 214. For example, a second end 244 of the pin 208 may be inserted into the first flowline member 202 and/or the first cylindrical passageway 214. The pin 208 may be connected to the first flowline member 202 and/or the first cylindrical passageway 214 via a slip engagement or a threaded engagement. The outer surface 232 of the pin 208 may define a first outer diameter 246 of the pin 208. In some implementations, the pin 208 may also have the first outer diameter 246 at the first end 242. A second portion of the pin 208 proximate to the second end 244 of the pin 208 that is to be inserted into the first flowline member 202 and/or the first cylindrical passageway 214 may have a second outer diameter 248 that is less than the first outer diameter 246. In other words, the pin 208 may be tapered (e.g., to reduce the outer diameter of the pin) proximate to the second end 244 of the pin 208 that is to be inserted into the first flowline member 202 and/or the first cylindrical passageway 214. The reduced outer diameter of the pin 208 proximate to the second end 244 may provide additional clearance when the pin 208 is inserted into the first flowline member 202 and/or the first cylindrical passageway 214, thereby reducing a likelihood of the second end 244 contacting the first flowline member 202 during installation (e.g., contacting the first flowline member 202 may cause damage to the pin 208 and/or one or more seals included in the pin 208, such as the first one or more seals 264 described in more detail elsewhere herein).

The first flowline member 202 may include a face 250. As shown in FIG. 4, when the pin 208 is inserted into the first flowline member 202 and/or the first cylindrical passageway 214, the face 250 may be configured to contact the first side 234 of the stop 230. The first flowline member 202 and/or the first cylindrical passageway 214 may include a seat 252 (e.g., similar to the seat 240). When the pin 208 is inserted into the first flowline member 202 and/or the first cylindrical passageway 214, the second end 244 may be configured to contact the seat 252.

The collar 206 may have a first inner diameter at a first end 254 of the collar 206 and a second inner diameter at a second end 256 of the collar 206. The first inner diameter may be greater than the second inner diameter. In other words, the inner diameter of the collar 206 may reduce over the length of the collar 206. The outer diameter of the collar 206 may be the same over the length of the collar 206. For example, the collar may include a tapered surface 258 having the first inner diameter at a first end of the tapered surface 258 and the second inner diameter at a second end of the tapered surface 258. As shown in FIG. 4, an inner surface of the collar 206 at the second end 256 may be configured to contact the second side 236 of the stop 230 via an engagement between the tapered surface 258 and the tapered surface of the second side 236 of the stop 230. For example, an angle of the tapered surface 258 may correspond to an angle of the tapered surface of the second side 236 of the stop 230 to create an engagement between the collar 206 and the pin 208. For example, the engagement between the collar 206 and the pin 208 may prevent the pin 208 from being removed from the first flowline member 202.

For example, as described in more detail elsewhere herein, the collar 206 may be configured for threaded engagement at the first end 254 with an outer surface 260 of the first flowline member 202. For example, the collar 206 may be threaded onto the first flowline member 202 at an interface 262 between an inner surface of the collar 206 and the outer surface 260 of the first flowline member 202. In some implementations, the first flowline member 202 may have a larger outer diameter (e.g., compared to other portions of the first flowline member 202) at the interface 262 (e.g., to correspond to the first inner diameter of the collar 206 at the first end 254). The inner surface of the collar 206 at the second end 256 may be configured to contact the second side 236 of the stop 230 to connect the first flowline member 202 with the second flowline member 204.

For example, the pin 208 may be connected to the second flowline member 204 (e.g., via an engagement with the inner surface 238). The pin 208 may be inserted into the first flowline member 202 and/or the first cylindrical passageway 214. The collar 206 may be connected to the first flowline member 202 via the threaded engagement. The pin 208 may be held in place via the contact and/or engagement between the collar 206 and the stop 230 of the pin 208, thereby connecting the first flowline member 202 to the second flowline member 204.

In some implementations, the second inner diameter of the collar 206 at the second end 256 may be greater than an outer diameter of the second flowline member 204 (e.g., as shown in FIG. 4). This may enable the collar 206 to be slid over the outer diameter of the second flowline member 204 during installation. This may provide more clearance and/or room for operators or workers to maneuver and/or align the pin 208 with the first flowline member 202 and/or the first cylindrical passageway 214 (e.g., prior to connecting the collar 206 to the first flowline member 202), thereby reducing a burden associated with connecting the first flowline member 202 to the second flowline member 204.

The flowline connector assembly 200 may include a first one or more seals 264 located proximate to the second end 244 of the pin 208 that is configured to be inserted into the first flowline member 202 and/or first cylindrical passageway 214. The one or more seals 264 may be configured to create a seal between the outer surface of the pin 208 at the second end 244 and an inner surface 238 of the first flowline member 202 and/or first cylindrical passageway 214. For example, the pin 208 may include one or more grooves extending radially around the pin 208 proximate to the second end 244 that are configured to seat the first one or more seals 264. Similarly, the flowline connector assembly 200 may include a second one or more seals 266 located proximate to the first end 242 of the pin 208 that is configured to be inserted into the second flowline member 204 and/or the second cylindrical passageway 216. The second one or more seals 266 may be configured to create a seal between the outer surface of the pin 208 at the first end 242 and the inner surface 238 of the second flowline member 204 and/or the second cylindrical passageway 216. For example, the pin 208 may include one or more grooves extending radially around the pin 208 proximate to the first end 242 that are configured to seat the second one or more seals 266. The first one or more seals 264 and/or the second one or more seals 266 may be radial seals, axial seals, lip seals, and/or another type of seal. Although FIG. 4 shows the first one or more seals 264 including two seals and the second one or more seals 266 including two seals, other quantities of seals are possible, such as 1 seal, 3 seals, 4 seals, and/or other quantities of seals.

In some implementations, the pin 208 may have a length that is configured to cause a face 268 of the second flowline member 204 to contact the collar 206 when the pin 208 is inserted into the first flowline member 202 and the second flowline member 204 and when the collar is connected (e.g., threaded on) to the first flowline member 202. For example, the length of the pin 208 may be such that when all components of the flowline connector assembly 200 are installed, there is little or no gap between the collar 206 and the second flowline member 204. This may reduce a likelihood of debris or other material entering into an interface between the pin 208 and the second flowline member 204.

As indicated above, FIG. 4 is provided as an example. Other examples may differ from what is described with regard to FIG. 4.

Figure 5:
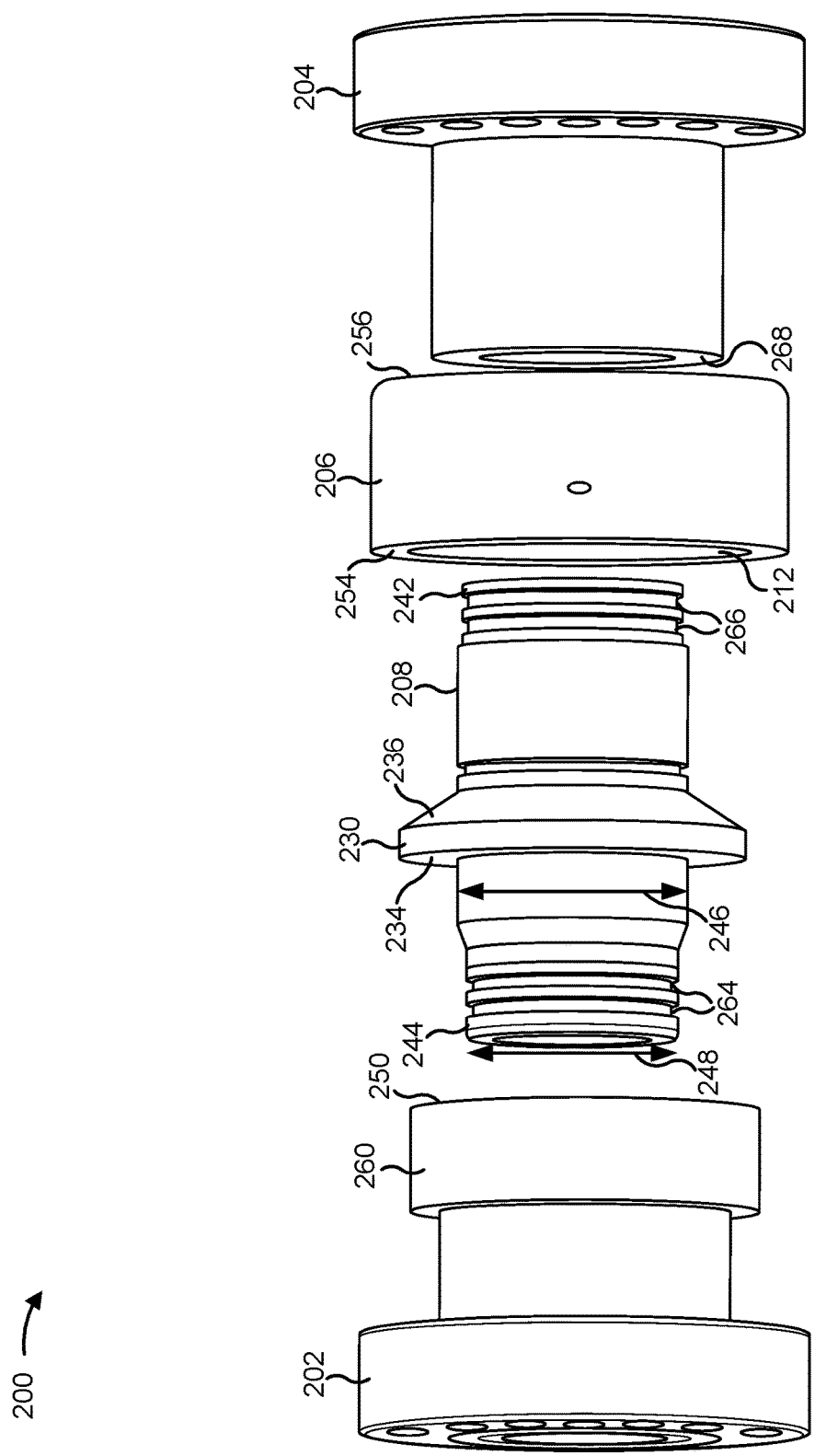
FIG. 5 is a diagram of an exploded view of the example flowline connector assembly described herein.

FIG. 5 is a diagram of an exploded view of the example flowline connector assembly 200 described herein. An installation process for connecting the first flowline member 202 to the second flowline member 204 may include the pin 208 being inserted into the second flowline member 204 and through the collar 206. In some implementations, the second flowline member 204 may be prefabricated with the pin 208 installed and connected to the second flowline member 204 (e.g., and through the collar 206). In some other cases, the pin 208 may be installed in the second flowline member 204 in the field.

After the pin 208 is installed within the second flowline member 204, the pin 208 may be inserted into the first flowline member 202 (e.g., at the second end 244 of the pin 208). As shown in FIG. 5, because the second outer diameter 248 is less than the first outer diameter 246 and because the second flowline member 204 may have an inner diameter that is slightly larger than the first outer diameter 246 at the face 250, the opening in which the pin 208 is inserted may be larger than the second outer diameter 248. This may provide clearance or space for a worker or operator to insert the pin 208 into the first flowline member 202 without damaging the pin 208 and/or the first one or more seals 264.

After the pin 208 is installed within the first flowline member 202 (e.g., with the first side 234 contacting the face 250), the collar 206 may be connected to the first flowline member 202. For example, the outer surface 260 of the first flowline member 202 may include threads (e.g., external threads) corresponding to threads (e.g., internal threads) included on an inner surface of the collar 206. The collar 206 may be connected (e.g., threaded on) to the first flowline member 202 to fix the pin 208 within the first flowline member 202. For example, the collar 206 may contact the stop 230 to prevent the pin 208 from being removed from the first flowline member 202. This may create a secure connection between the first flowline member 202 and the second flowline member 204 while only requiring that the pin 208 be aligned with an opening of the first flowline member 202, thereby reducing a burden associated with connecting the first flowline 112*a* to a second flowline 112*b*.

As indicated above, FIG. 5 is provided as an example. Other examples may differ from what is described with regard to FIG. 5.

Figure 6:
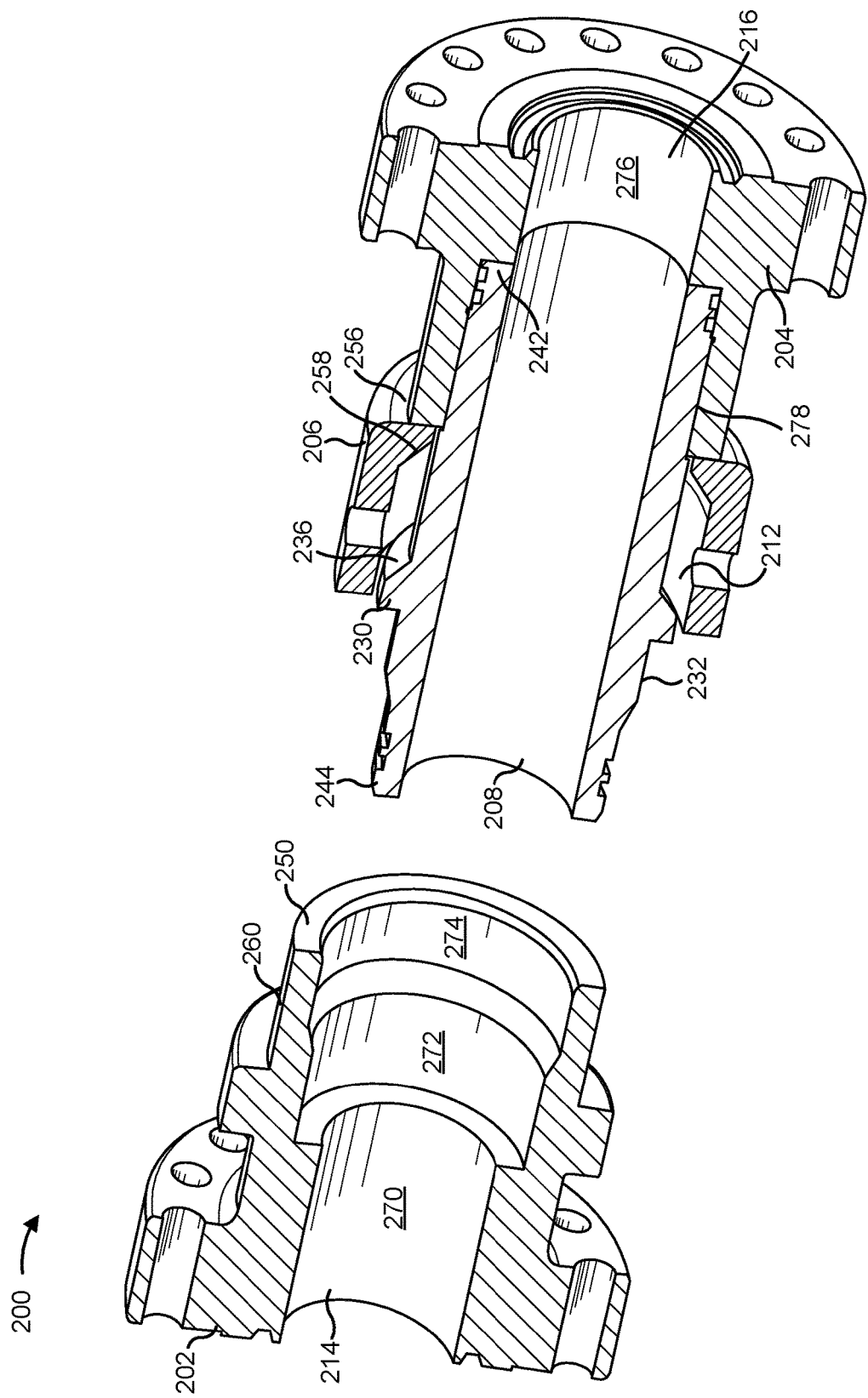
FIG. 6 is a diagram of a cross-section view of the example flowline connector assembly described herein.

FIG. 6 is a diagram of a cross-section view of the example flowline connector assembly 200 described herein. FIG. 6 shows the pin 208 installed within the second flowline member 204. For example, FIG. 6 may depict the flowline connector assembly 200 as fabricated or delivered to a job site. As another example, FIG. 6 may depict the flowline connector assembly 200 in a state when the first flowline member 202 is connected to the first flowline 112*a* and the second flowline member 204 is connected to the second flowline 112*b*.

In some implementations, the first flowline member 202 and/or the first cylindrical passageway 214 may include a first portion 270 having a first inner diameter, a second portion 272 having a second inner diameter, and a third portion 274 having a third inner diameter. The first inner diameter of the first portion 270 may be approximately the same as (e.g., within a tolerance or a threshold amount) an inner diameter of the pin 208. In some implementations, the first inner diameter of the first portion 270 and/or the inner diameter of the pin 208 may be associated with a large bore flowline (e.g., may have an inner diameter of 3 inches, 4 inches, 5 inches or larger). The second inner diameter may be greater than the first inner diameter of the first portion 270 and may be less than the third inner diameter of the third portion 274. The second portion 272 may be configured to receive a portion of the pin 208 (e.g., the second end 244) based on the second inner diameter (e.g., the second inner diameter may be slightly larger (e.g., within a tolerance or threshold amount) than the second outer diameter 248 of the pin 208 at the second end 244). The third portion 274 may be configured to receive the outer surface 232 of the pin 208 based on the third inner diameter (e.g., the third inner diameter may be slightly larger (e.g., within a tolerance or threshold amount) than the first outer diameter 246 of the pin 208). In this way, the opening of the first flowline member 202 may be larger than the second outer diameter 248 of the pin 208, providing additional clearance or space for the pin 208 to be inserted into the first flowline member 202.

The second flowline member 204 and/or the second cylindrical passageway 216 may include a first portion 276 having a first inner diameter. The first inner diameter may be the same as the inner diameter of the first portion 270. The second flowline member 204 and/or the second cylindrical passageway 216 may include a second portion 278 having a second inner diameter. The second inner diameter of the second portion 278 may be the same as the third inner diameter of the third portion 274 of the first flowline member 202. In some examples, the second inner diameter of the second portion 278 may be the same as the second inner diameter of the second portion 272 of the first flowline member 202. In other words, the second flowline member 204 and/or the second cylindrical passageway 216 may include two different inner diameters (e.g., rather than three as with the first flowline member 202) because the pin 208 may be pre-installed and/or connected to the second flowline member 204 prior to connecting the first flowline member 202 to the second flowline member 204. This may reduce a complexity of the second flowline member 204 and/or reducing a machining cost associated with producing the second flowline member 204.

As shown in FIG. 6, the second inner diameter at the second end 256 of the collar 206 may be less than the outer diameter of the second flowline member 204. This may enable the tapered surface 258 to have an increased length and/or surface area. As a result, an engagement between the second side 236 of the stop 230 and the tapered surface 258 may be improved (e.g., due to the increased surface area of the tapered surface 258 that is contacting the second side 236 of the stop 230).

As indicated above, FIG. 6 is provided as an example. Other examples may differ from what is described with regard to FIG. 6.

Figure 7:
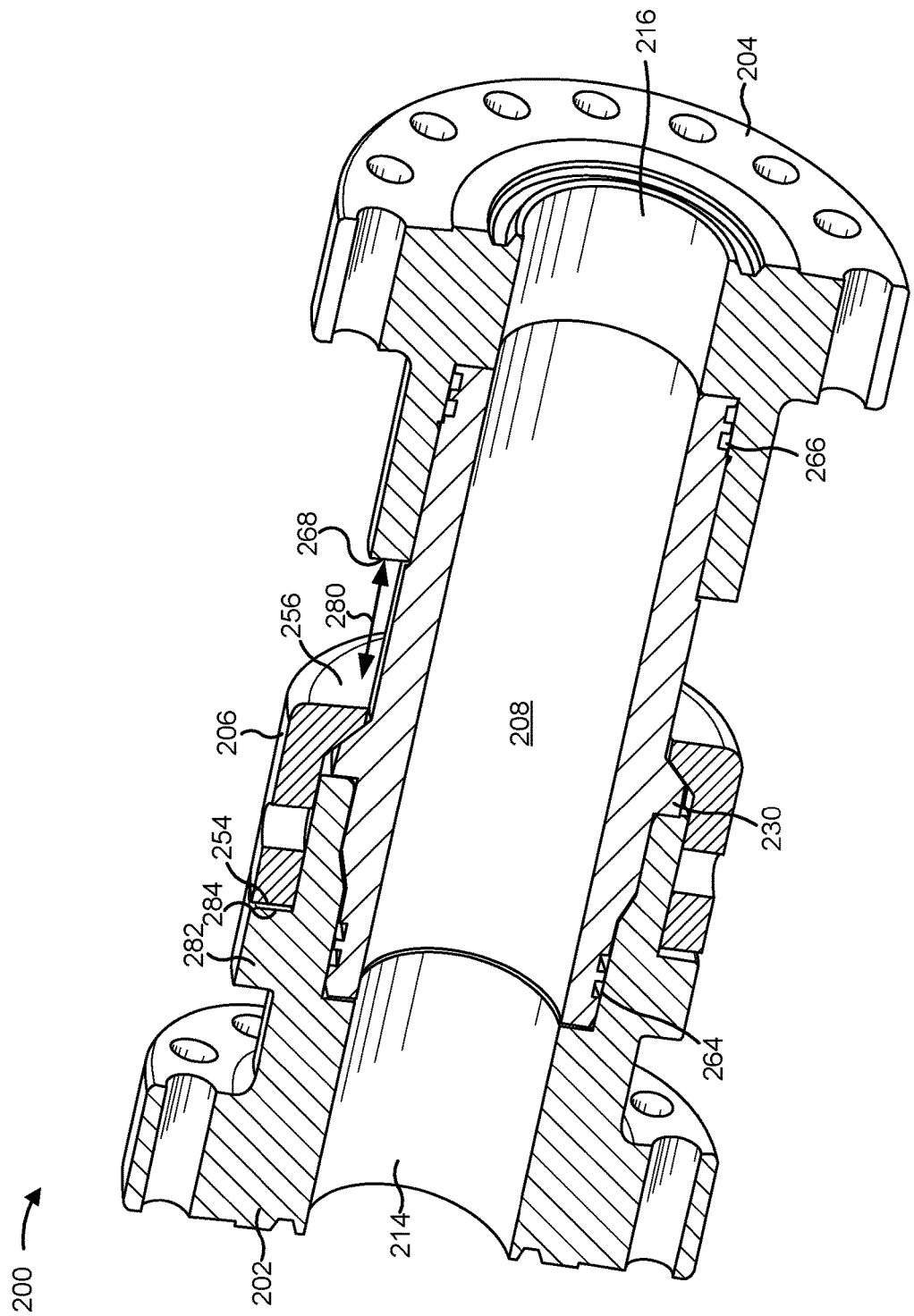
FIG. 7 is a diagram of a cross-section view of the example flowline connector assembly described herein.

FIG. 7 is a diagram of a cross-section view of the example flowline connector assembly 200 described herein. FIG. 7 depicts the flowline connector assembly 200 with the pin 208 inserted into the first flowline member 202 and the collar 206 connected to the first flowline member 202 (e.g., in a connected or configured state).

As shown in FIG. 7, the pin 208 may have a length that is configured to cause a gap 280 to be between the face 268 of the second flowline member 204 and the collar 206 (e.g., and the second end 256 of the collar 206) when the pin 208 is inserted into the first flowline member 202 and the second flowline member 204. For example, the gap 280 may provide space for the collar 206 to slide away from the first flowline member 202 (e.g., such as when the pin 208 is being inserted into the first flowline member 202) when the second inner diameter at the second end 256 of the collar 206 is less than the outer diameter of the second flowline member 204 (e.g., as depicted in FIGS. 6 and 7).

In some implementations, the outer surface 260 of the first flowline member 202 may include a protrusion 282 extending radially outward from the outer surface 260. The protrusion 282 may include a face 284 that is configured to contact the first end 254 of the collar 206 when the collar 206 is connected to the first flowline member 202. For example, the protrusion 282 may serve as a stop for the collar 206.

As indicated above, FIG. 7 is provided as an example. Other examples may differ from what is described with regard to FIG. 7.

Figure 8:
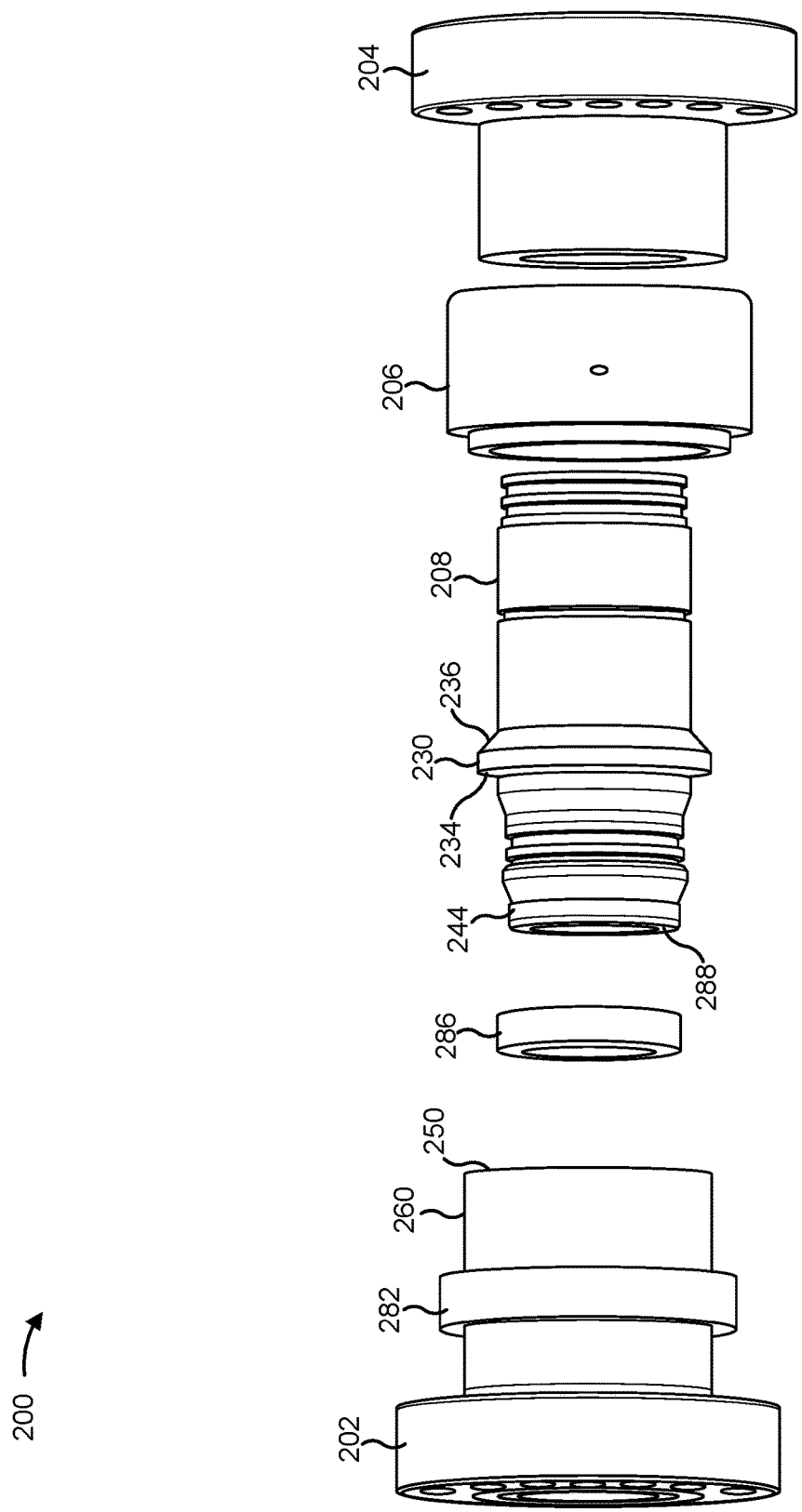
FIG. 8 is a diagram of an exploded view of the example flowline connector assembly described herein.

FIG. 8 is a diagram of an exploded view of the example flowline connector assembly 200 described herein. As shown in FIG. 8, the flowline connector assembly 200 may include a protective cap 286. The protective cap 286 may be configured to cover the second end 244 of the pin 208. For example, the pin 208 may include the protective cap 286 at the second end 244 of the pin 208.

The protective cap 286 may include a material that is configured to withstand damage or blows during the installation of the pin 208 into the first flowline member 202. For example, the protective cap 286 may be a metal material, a plastic material, or a composite material, among other examples.

In some cases, the protective cap 286 may cover an end face 288 of the pin 208 and/or an outer surface of the pin 208 at the second end 244. For example, the protective cap 286 may cover the end face 288 and the outer surface of the pin 208 at the second end 244. Alternatively, the protective cap 286 may cover the outer surface of the pin 208 at the second end 244, but not the end face 288.

As indicated above, FIG. 8 is provided as an example. Other examples may differ from what is described with regard to FIG. 8.

Figure 9:
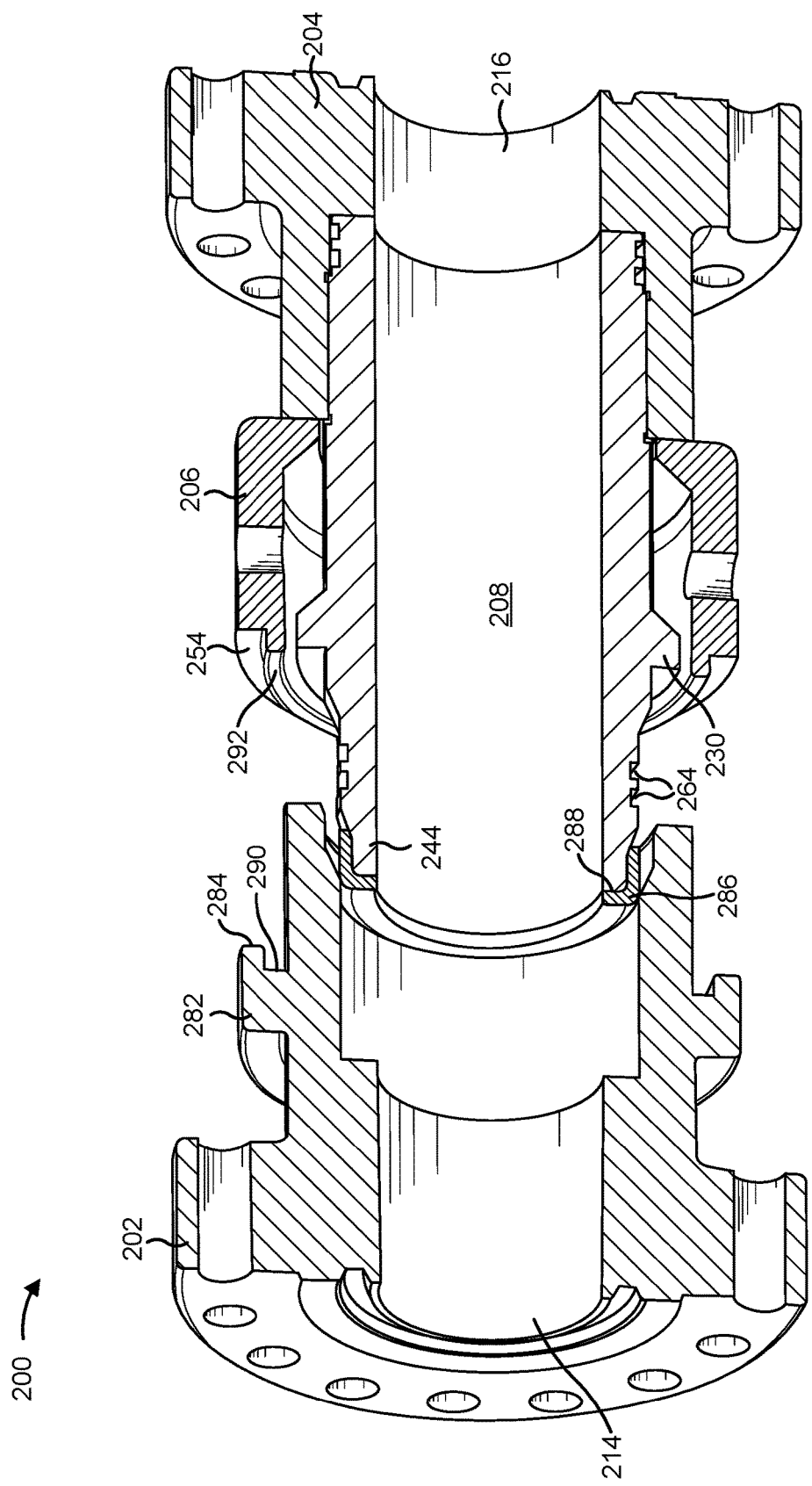
FIG. 9 is a diagram of a cross-section view of the example flowline connector assembly described herein.

FIG. 9 is a diagram of a cross-section view of the example flowline connector assembly 200 described herein. FIG. 9 depicts the pin 208 partially inserted into the first flowline member 202. As shown in FIG. 9, the protective cap 286 may at least partially cover the second end 244 of the pin 208. This may protect the pin 208 and/or the first one or more seals 264 from damage during installation or insertion of the pin 208 into the first flowline member 202.

In some implementations, the protrusion 282 of the first flowline member 202 may include a groove 290 that is configured to receive a tongue 292 of the collar 206. For example, the tongue 292 may extend radially from the first end 254 of the collar 206. The groove 290 may extend into the face 284 of the protrusion 282. When the collar 206 is connected to (e.g., threaded onto) the first flowline member 202, the tongue 292 may be inserted into the groove 290. This may improve the connection between the collar 206 and the first flowline member 202.

As indicated above, FIG. 9 is provided as an example. Other examples may differ from what is described with regard to FIG. 9.

Figure 10:
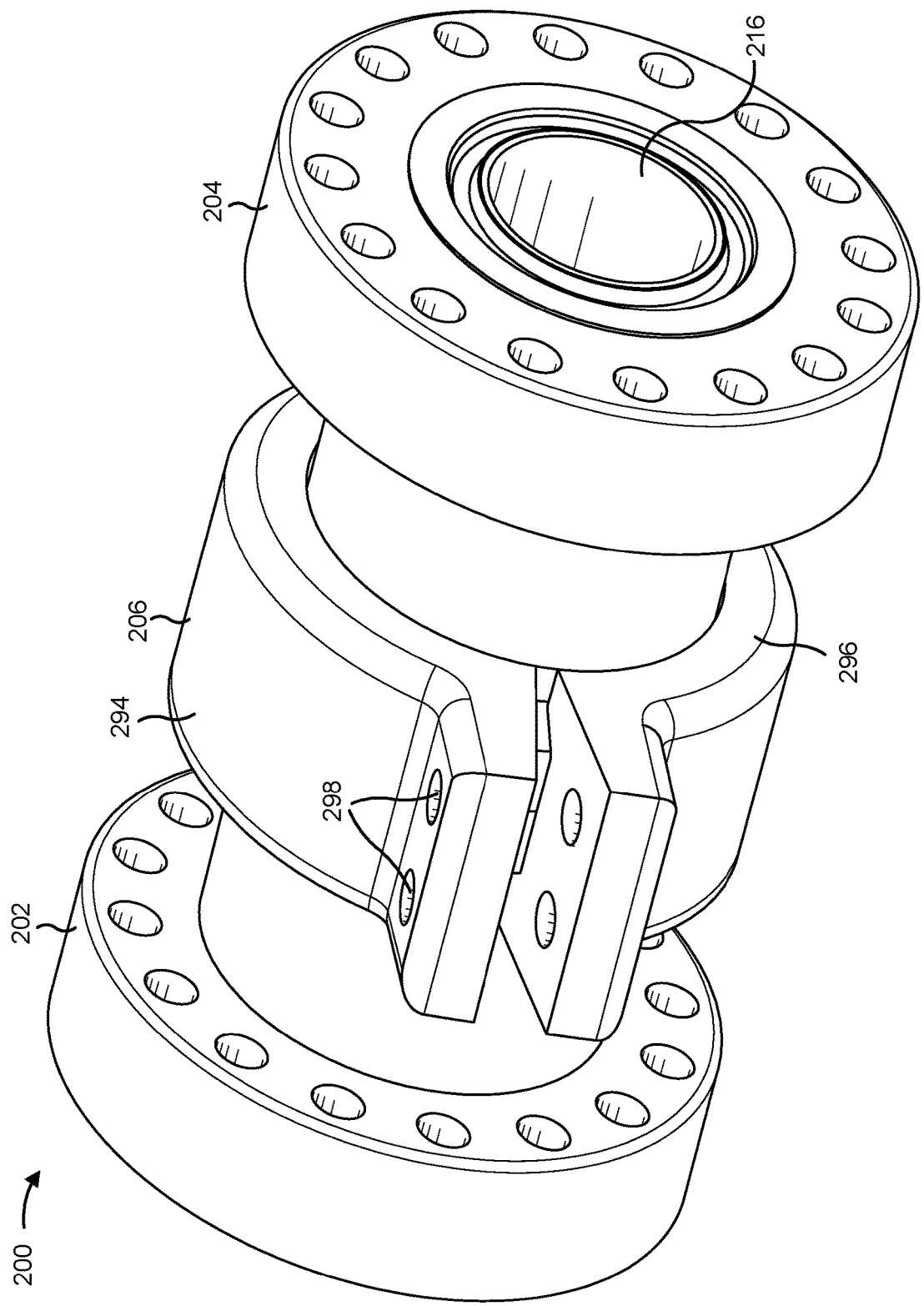
FIG. 10 is a diagram of a perspective view of an example flowline connector assembly described herein.

FIG. 10 is a diagram of a perspective view of an example flowline connector assembly 200 described herein. FIG. 10 depicts an example in which the collar 206 is connected to the first flowline member 202 via a bolted connection. For example, the collar 206 may be a clamshell collar or a similar type of collar.

For example, the collar may include a first collar member 294 and a second collar member 296. The first collar member 294 and the second collar member 296 may be connected via at least one of a hinge or one or more bolts. For example, the first collar member 294 and/or the second collar member 296 may include apertures 298 via which one or more threaded bolts may be inserted to connect the first collar member 294 to the second collar member 296. The clamshell collar may be defined by the first collar member 294, the second collar member 296, and a hinge connecting the first collar member 294 and the second collar member 296. In some implementations, the first collar member 294 and the second collar member 296 may be connected by two bolted connections (e.g., and no hinge). In other cases, the first collar member 294 and the second collar member 296 may be connected by a single bolted connection and a hinge.

Figure 11:
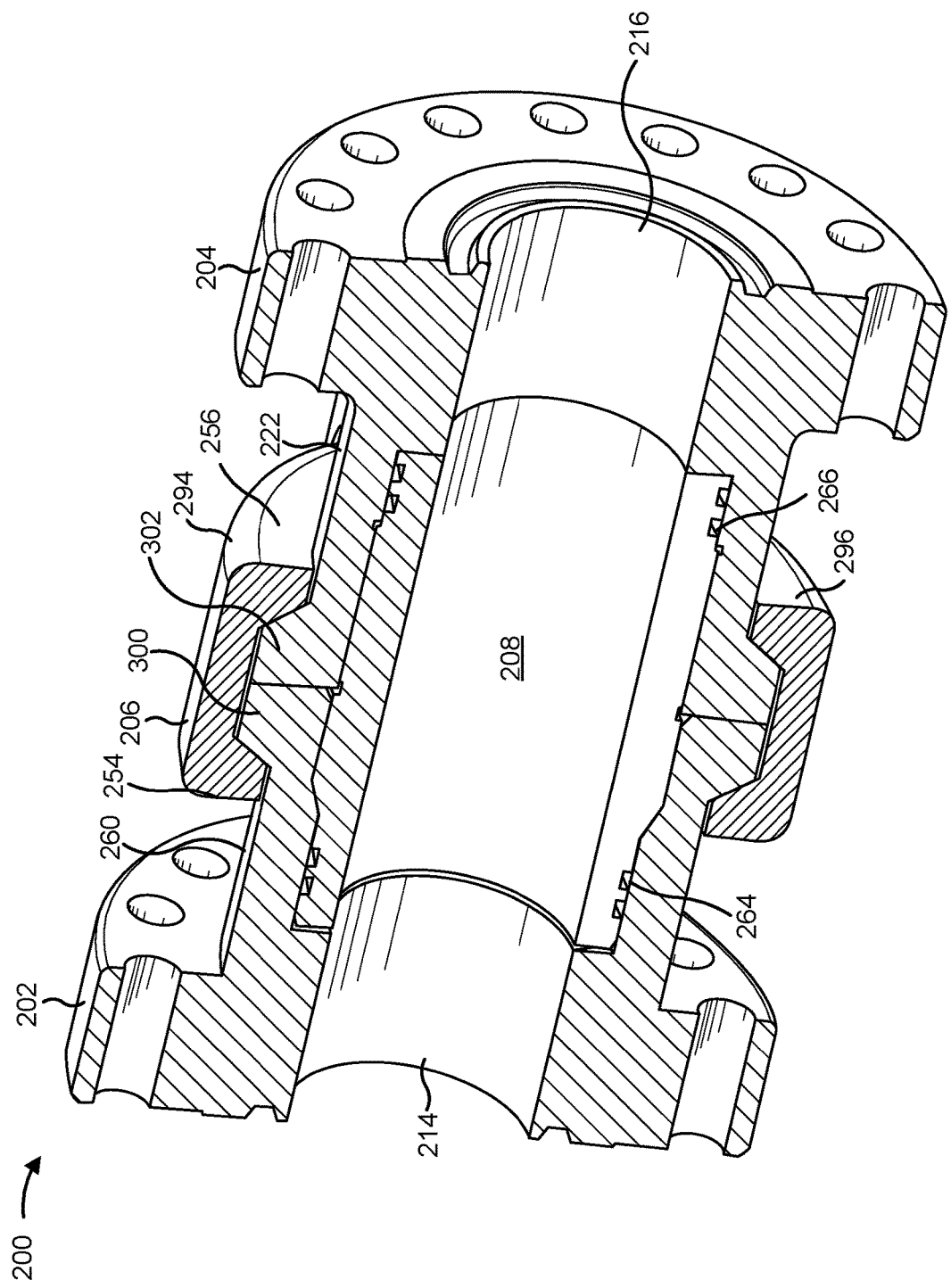
FIG. 11 is a diagram of a cross-section view of the example flowline connector assembly described herein.

The clamshell collar may include two half sections (e.g., the first collar member 294 and the second collar member 296) that may be hinged and secured around the first flowline member 202 and the second flowline member 204. In some implementations, the first flowline member 202 and the second flowline member 204 may incorporate angled surfaces (e.g., similar to the stop 230) that meet sloped end walls of the clamshell collar (e.g., as depicted in FIG. 11). In this way, the collar 206 may connect the first flowline member 202 to the second flowline member 204 by securing the first collar member 294 and the second collar member 296 around the first flowline member 202 and the second flowline member 204.

As indicated above, FIG. 10 is provided as an example. Other examples may differ from what is described with regard to FIG. 10.

FIG. 11 is a diagram of a cross-section view of the example flowline connector assembly 200 described herein.

The collar 206 (e.g., the first collar member 294 and the second collar member 296) may have a first inner diameter at the first end 254 of the collar 206 and at the second end 256 of the collar 206 (e.g., the inner diameter at the two ends of the collar 206 may be approximately the same). The collar 206 (e.g., the first collar member 294 and the second collar member 296) may have a second inner diameter at a middle portion of the collar 206. The first inner diameter (e.g., at the ends of the collar 206) may be less than the second inner diameter (e.g., at the middle portion of the collar 206). For example, the collar 206 (e.g., the first collar member 294 and the second collar member 296) may include a first sloped or tapered surface extending from the middle portion to the first end 254 and a second sloped or tapered surface extending from the middle portion to the second end 256.

The first flowline member 202 may include a stop 300. The stop 300 may extend radially outward from the outer surface 260 of the first flowline member 202. The stop 300 may be similar to the stop 230 of the pin 208. For example, a first side of the stop 300 may be a tapered surface or a sloped surface extending from outer surface 260 of the first flowline member 202. For example, an angle between the first side of the stop 300 and the outer surface 260 may be greater than 90 degrees. In other words, the first side of the stop 300 may be tapered toward a second side of the stop 300 (e.g., the stop 300 may be wider at a base of the stop 300 near the outer surface 260 than at a top of the stop 300).

In some implementations, the second flowline member 204 may include a stop 302. The stop 302 may be similar to the stop 300 and/or the stop 230. For example, the stop 302 may extend radially from the outer surface 222 of the second flowline member 204. A first side of the stop 302 may be a tapered surface or a sloped surface extending from outer surface 222 of the second flowline member 204. For example, an angle between the first side of the stop 302 and the outer surface 222 may be greater than 90 degrees. In other words, the first side of the stop 302 may be tapered toward a second side of the stop 302 (e.g., the stop 302 may be wider at a base of the stop 302 near the outer surface 222 than at a top of the stop 302). In some implementations, the second flowline member 204 including the stop 302 may be used in connection with the collar 206 having a threaded connection with the first flowline member 202 (e.g., as depicted in FIGS. 3-9). For example, rather than the pin 208 having a stop (e.g., the stop 230) that is configured to contact the collar 206, the second flowline member 204 may include the stop 302 that is configured to contact the collar 206.

As shown in FIG. 11, the inner surface of the collar 206 at the first end 254 may be configured to contact the side of the stop 300 via an engagement between the tapered surfaces of the stop 300 and the collar 206 (e.g., a first tapered or sloped face of the collar 206 is configured to engage with a sloped or tapered surface of the stop 300). Similarly, the inner surface of the collar 206 at the second end 256 may be configured to contact the side of the stop 302 via an engagement between the tapered surfaces of the stop 302 and the collar 206 (e.g., a second tapered or sloped face of the collar 206 is configured to engage with a sloped or tapered surface of the stop 302). In other words, the inner surface of the collar 206 at the first end 254 is configured to contact the first side of a first stop (e.g., the stop 300) and the inner surface of the collar 206 at the second end 256 is configured to contact a first side of a second stop (e.g., the stop 302) to connect the first flowline member 202 to the second flowline member 204.

In the example shown in FIG. 11, the pin 208 may not include the stop 230. For example, the pin 208 may be similar to the pin 208 as described in more detail elsewhere herein, but without the stop 230. The pin 208 may be integrally connected to the first flowline member 202 and/or the second flowline member 204. In some cases, the pin 208 may be integrally connected to the second flowline member 204 (e.g., via a welded connection or a threaded connection, among other examples), and may be slipped into the first flowline member 202 (e.g., and held in place via the collar 206).

As indicated above, FIG. 11 is provided as an example. Other examples may differ from what is described with regard to FIG. 11.

Figure 12:
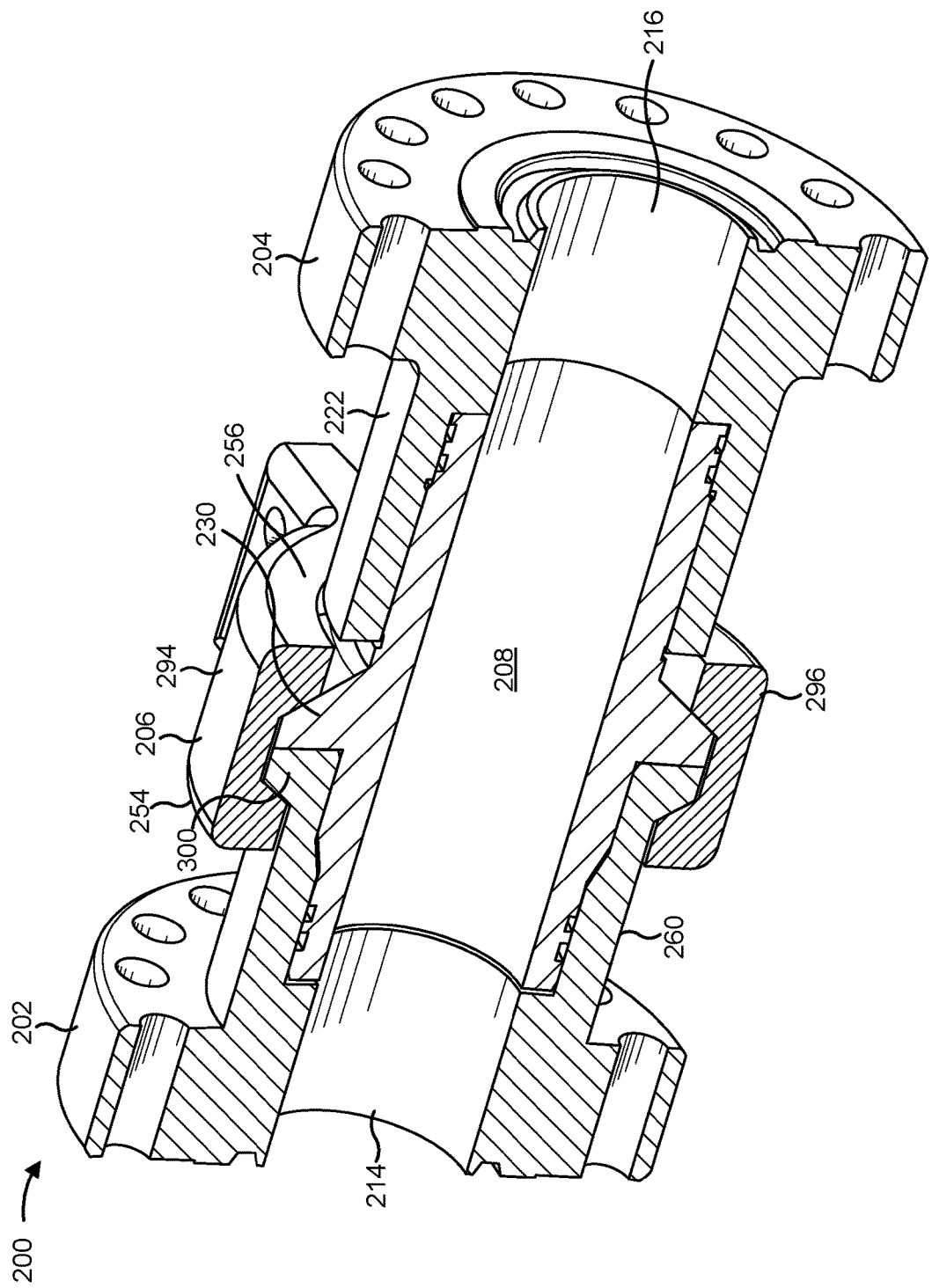
FIG. 12 is a diagram of a cross-section view of the example flowline connector assembly described herein.

FIG. 12 is a diagram of a cross-section view of the example flowline connector assembly 200 described herein. As shown in FIG. 12, the collar 206 (e.g., the clamshell collar) may connect the first flowline member 202 to the second flowline member 204 via an engagement with the stop 230 of the pin 208 and the stop 300 of the first flowline member 202.

For example, as described in more detail elsewhere herein, the first flowline member 202 may include a first stop (e.g., the stop 300) and the pin 208 may include a second stop (e.g., the stop 230). The collar 206 may be configured around the first flowline member 202 and the pin 208 such that the inner surface of the collar 206 contacts outer surfaces of the stop 230 and the stop 300. The pin 208 may be connected (e.g., via a weld or a threaded engagement, among other examples) with the second flowline member 204, as described elsewhere herein. For example, the pin 208 may be similar to, or the same as, the pin 208 described elsewhere herein (such as in connection with FIGS. 3-9). The second flowline member 204 may be similar to, or the same as, the second flowline member 204 described elsewhere herein (such as in connection with FIGS. 3-9).

As indicated above, FIG. 12 is provided as an example. Other examples may differ from what is described with regard to FIG. 12.

Figure 13:
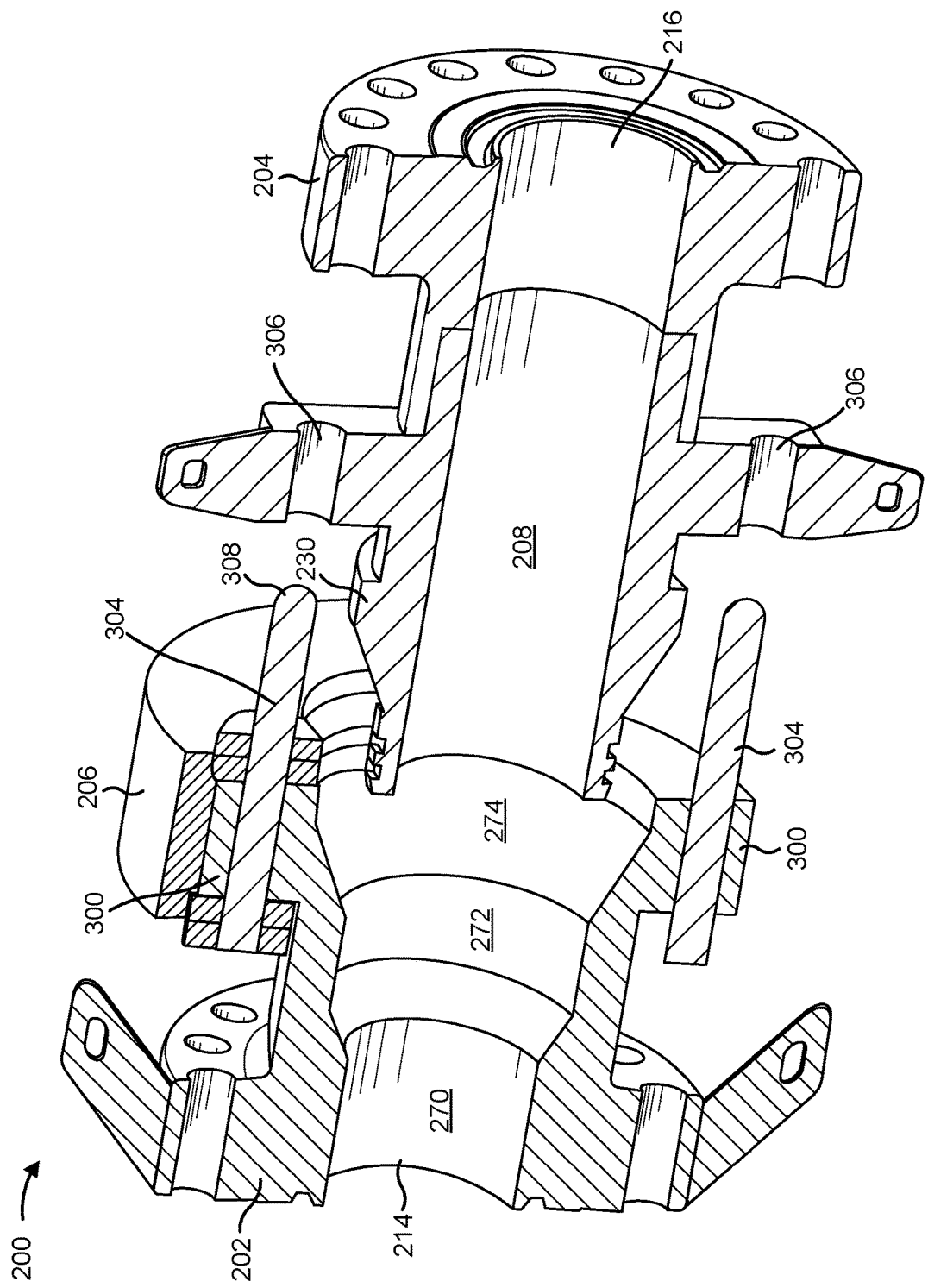
FIG. 13 is a diagram of a cross-section view of the example flowline connector assembly described herein.

FIG. 13 is a diagram of a cross-section view of the example flowline connector assembly 200 described herein. The example depicted in FIG. 13 may be similar to the example depicted in FIG. 12 in which the collar 206 is configured to connect the first flowline member 202 to the second flowline member 204 via the stop 300 of the first flowline member 202 and the stop 230 of the pin 208. However, other configurations described herein may be similarly applied with the components or features described in connection with FIG. 13.

As shown in FIG. 13, the flowline connector assembly 200 may include one or more guide pins 304. The guide pin(s) 304 may facilitate an alignment of the pin 208 with the first flowline member 202 and/or the first cylindrical passageway 214. For example, the guide pin(s) 304 may extend through the collar 206, the first flowline member 202, and the second flowline member 204 (or the pin 208). For example, as shown in FIG. 13, the collar 206, the first flowline member 202, and the pin 208 may include apertures in which a guide pin 304 may be inserted. For example, the pin 208 may include one or more apertures 306 in which a guide pin 304 may be inserted. In some other examples, the second flowline member 204 (e.g., rather than the pin 208) may include an aperture in which a guide pin 304 may be inserted. The guide pin(s) 304 may be configured to facilitate an alignment of the pin 208 with the first cylindrical passageway 214 (and/or the second cylindrical passageway 216).

For example, a guide pin 304 may be inserted into the collar 206 and/or the first flowline member 202. The pin 208 may be inserted into, or otherwise connected to, the second flowline member 204. The guide pin 304 may be aligned with an aperture (e.g., the aperture 306) included in the pin 208 and/or the second flowline member 204. Therefore, as the pin 208 is moved closer to the first flowline member 202, the guide pin(s) 304 may ensure that the pin 208 is aligned with the opening of the first flowline member 202 and/or the first cylindrical passageway 214. This may reduce a burden associated with a worker or operator manually aligning the pin 208 with the opening of the first flowline member 202 and/or the first cylindrical passageway 214 as the pin 208 is inserted into the first flowline member 202. Additionally, this may reduce a likelihood of damage caused by the pin 208 contacting the first flowline member 202 (e.g., due to a misalignment) during installation.

In some cases, at least one end of the one or more guide pins 304 may be tapered. For example, a first end 308 of a guide pin 304 may be tapered. The tapering may reduce a difficulty associated with aligning the guide pin 304 with an aperture, such as the aperture 306. In some cases, both ends of the guide pin 304 may be tapered. In other cases, a single end (e.g., the first end 308) may be tapered.

As indicated above, FIG. 13 is provided as an example. Other examples may differ from what is described with regard to FIG. 13.

Figure 14:
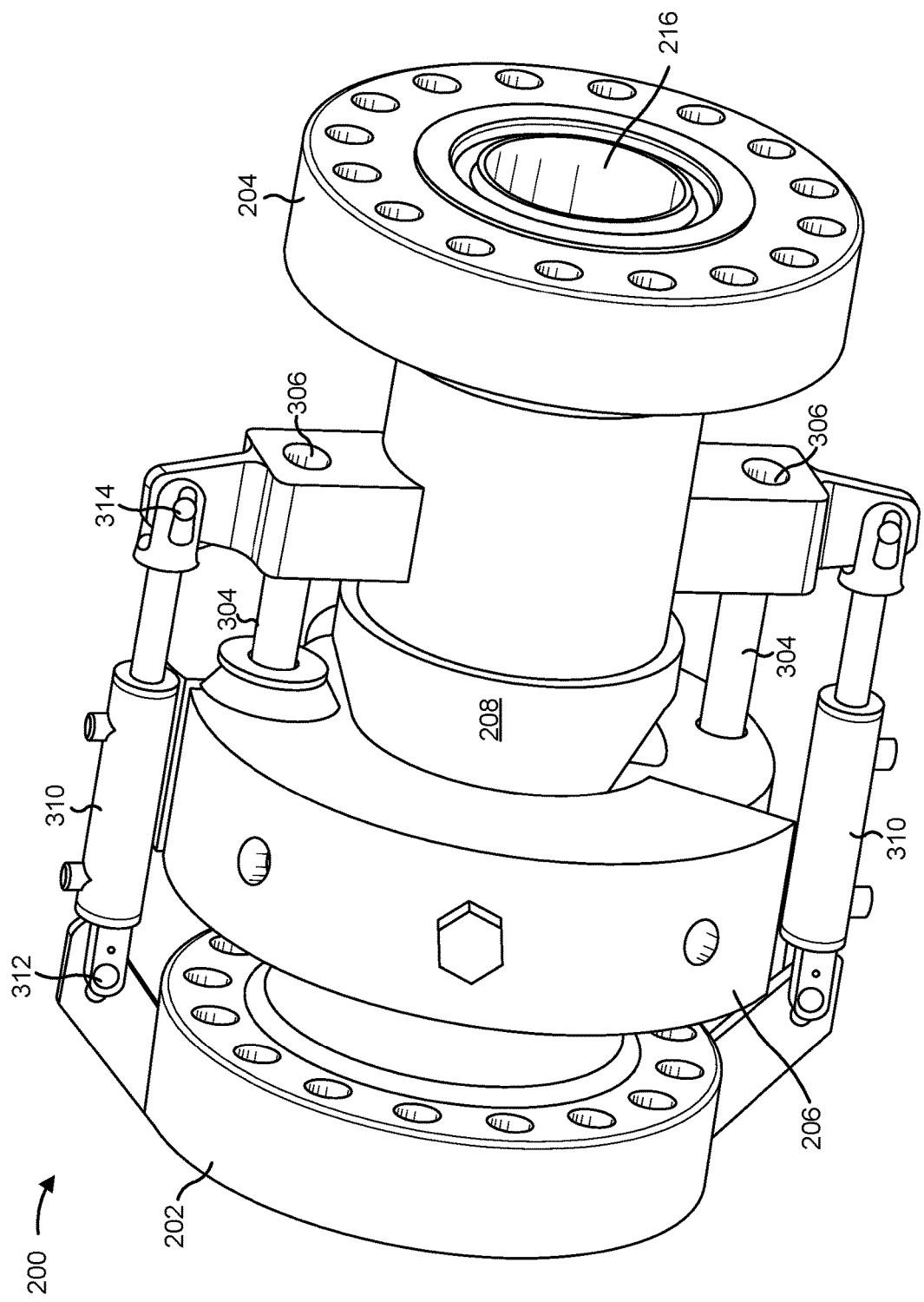
FIG. 14 is a diagram of a perspective view of the example flowline connector assembly described herein.

FIG. 14 is a diagram of a perspective view of the example flowline connector assembly 200 described herein. As shown in FIG. 14, the flowline connector assembly 200 may include one or more hydraulic cylinders 310 that facilitate establishing a connection between the first flowline member 202.

For example, the one or more hydraulic cylinders 310 may be connected to the first flowline member 202 and the second flowline member 204 and may be configured to facilitate an insertion of the pin 208 within the first cylindrical passageway 214 and/or the second cylindrical passageway 216. In some cases, the one or more hydraulic cylinders 310 may be connected to the first flowline member 202 and the pin 208. The one or more hydraulic cylinders 310 may be used to facilitate an insertion of the pin 208 within the first cylindrical passageway 214 and/or the second cylindrical passageway 216 in examples that include the guide pin(s) 304 or in examples that do not include the guide pin(s) 304.

As shown in FIG. 14, a hydraulic cylinder 310 may be connected to the first flowline member 202 at a first connection point 312 (e.g., via a bolt, nut, screw, or other means). The hydraulic cylinder 310 may be connected to the second flowline member 204 and/or the pin 208 at a second connection point 314 (e.g., via a bolt, nut, screw, or other means). The hydraulic cylinder 310 may be actuated (e.g., a rod of the hydraulic cylinder 310 may be extended or retracted) to cause the second flowline member 204 and/or the pin 208 to be moved toward the first flowline member 202, thereby facilitating an insertion of the pin 208 within the first cylindrical passageway 214 and/or the second cylindrical passageway 216.

As indicated above, FIG. 14 is provided as an example. Other examples may differ from what is described with regard to FIG. 14.

Figure 15:
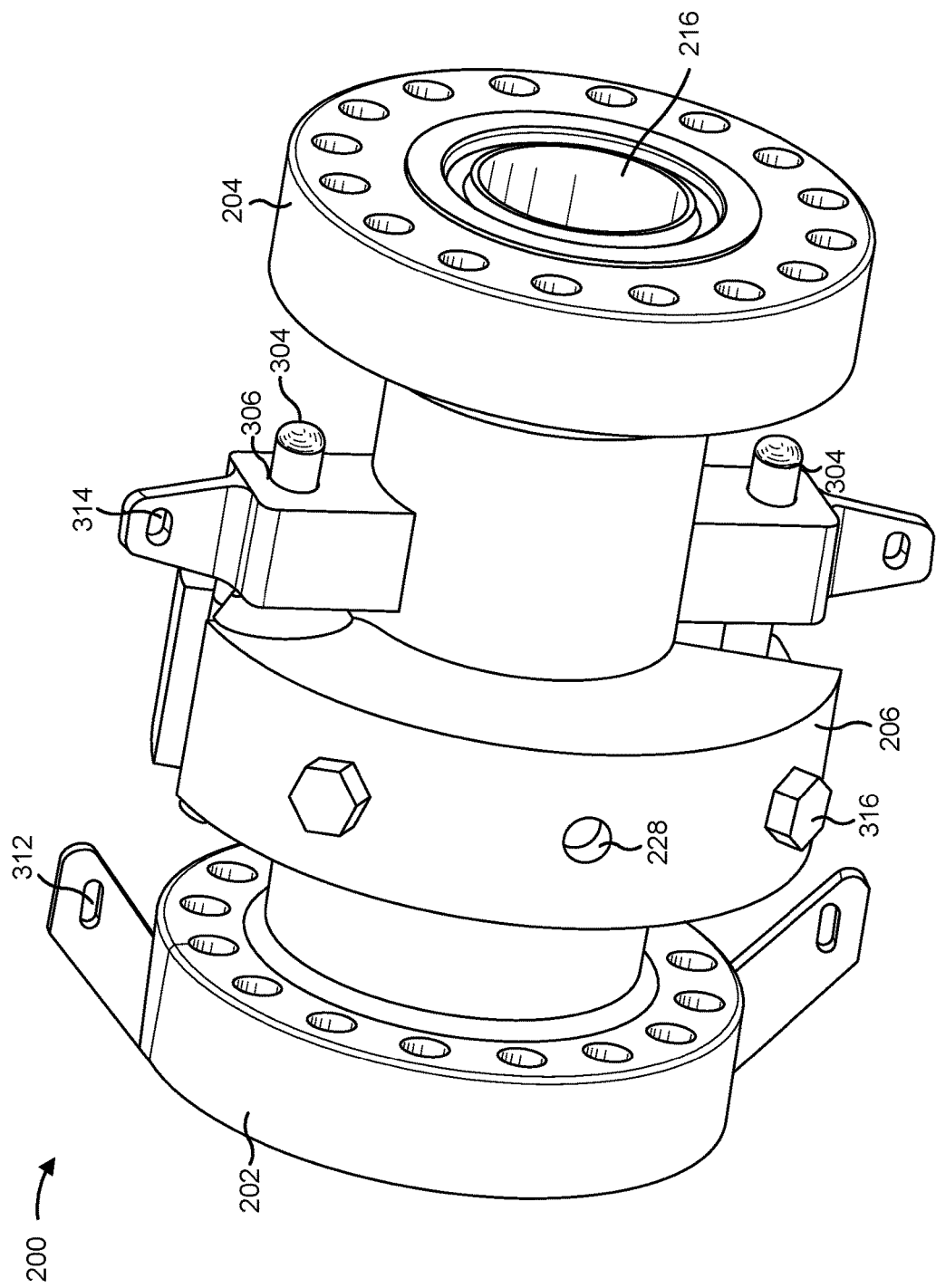
FIG. 15 is a diagram of a perspective view of the example flowline connector assembly described herein.

FIG. 15 is a diagram of a perspective view of the example flowline connector assembly 200 described herein. FIG. 15 depicts the flowline connector assembly 200 in a connected state (e.g., with the first flowline member 202 connected to the second flowline member 204). As shown in FIG. 15, a bolt 316 may be inserted into an aperture 228 of the collar 206 to prevent a rotation or movement of the collar 206.

In the example depicted in FIG. 15, the one or more hydraulic cylinders 310 may have been used to establish the connection between the first flowline member 202 and the second flowline member 204, as described elsewhere herein. As shown in FIG. 15, the one or more hydraulic cylinders 310 may be removable. For example, after the connection between the first flowline member 202 and the second flowline member 204 has been established, a hydraulic cylinder 310 may be removed from the first connection point 312 and the second connection point 314. This enables the hydraulic cylinder 310 to be reused for establishing connections associated with other flowline connector assemblies 200 or for other purposes, thereby conserving costs.

As indicated above, FIG. 15 is provided as an example. Other examples may differ from what is described with regard to FIG. 15.

INDUSTRIAL APPLICABILITY

Flowline components may include joints or sections of steel pipe of differing lengths, and including various junctions, valves, and/or swivels, among other examples. Generally, because the equipment configuration is different at each site, operators have to customize and connect the various components and flowlines to extend around a variety of well site equipment. A given equipment configuration may include multiple connections, and each connection must be able to withstand the high-pressure fluids flowing in the flowlines. The operators need to be able to quickly make and break out the connections to minimize the time needed for each job.

The larger size flowlines used on oil well sites may be large and/or heavy and may require a crane or other equipment to lift and maneuver the flowlines to achieve proper alignment when establishing a connection between two flowlines or other equipment. This process typically involves a team of operators who must exert a large amount of energy to maneuver the flowlines and/or equipment into place and achieve alignment. For example, flowlines are typically connected via flanged connectors. The flanged connectors may be secured together with, for example, sixteen bolts that must all be in alignment and then tightened in a particular sequence to establish a proper connection. The flanged connectors also commonly incorporate an annular seal disposed in a groove at the interface between the two flanges. This seal often falls out of the groove and may become damaged during installation. The task of connecting the conventional flowline components is thus inefficient, physically taxing, and time-consuming.

The flowline connector assembly 200 described herein reduces a physical burden and conserves time associated with connecting flowline components associated with large bore and/or high fluid pressure applications. For example, the collar 206 may be used to connect the first flowline member 202 to the second flowline member 204. Therefore, the only alignment required for connecting the flowline components may be associated with aligning the pin 208 with an opening of the first flowline member 202. Because the components of the flowline connector assembly 200 may be smaller than conventional flowline components, the alignment may be less physically burdensome and/or time consuming. Additionally, aligning a single pin within a single opening may be less physically burdensome and/or time consuming than aligning multiple (e.g., 16 or more) holes for bolts of flanged connectors. The pin 208 may be tapered at the end to the inserted into the first flowline member 202, creating additional clearance or room to operate during the installation procedure. Further, additional components, such as a guide pin 304 and/or a hydraulic cylinder 310 may be used to further facilitate the alignment of the pin 208 with an opening of the first flowline member 202.

As a result, the task of connecting flowline components may be more efficient, less physically taxing, and/or less time-consuming, among other examples. Additionally, a likelihood of damage to a component of the flowline connector assembly 200, such as the pin 208 and/or seals included in the flowline connector assembly 200, among other examples, during installation may be reduced.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A flowline connector assembly comprising:
    a first flowline member having an annular configuration defining a first cylindrical passageway;
    a second flowline member having an annular configuration defining a second cylindrical passageway;
    a pin including a stop extending radially outward from an outer surface of the pin,
        wherein the pin is configured to be inserted into the first cylindrical passageway and the second cylindrical passageway,
        wherein a first side of the stop is configured to contact a face of the first flowline member when the pin is inserted into the first cylindrical passageway,
        wherein the pin defines a third cylindrical passageway, and
        wherein, when the pin is inserted into the first cylindrical passageway and the second cylindrical passageway:
            the first cylindrical passageway, the second cylindrical passageway, and the third cylindrical passageway together define a fluid passageway having an inner diameter that is substantially constant along a length of the flowline connector assembly from the first flowline member to the second flowline member; and
    a collar having a first inner diameter at a first end of the collar and a second inner diameter at a second end of the collar,
        wherein the first inner diameter is greater than the second inner diameter, wherein the collar is configured for threaded engagement at the first end with an outer surface of the first flowline member, and
        wherein an inner surface of the collar at the second end is configured to contact a second side of the stop to connect the first flowline member with the second flowline member.

2. The flowline connector assembly of claim 1, wherein the pin is engaged with the second cylindrical passageway via at least one of:
    a threaded engagement,
    a welded engagement, or
    an integral engagement.

3. The flowline connector assembly of claim 1, wherein the second side of the stop is a first tapered surface extending from the outer surface of the pin,
    wherein the collar includes a second tapered surface having the first inner diameter at a first end of the second tapered surface and the second inner diameter at a second end of the second tapered surface, and
    wherein the inner surface of the collar at the second end is configured to contact the second side of the stop via an engagement between the first tapered surface and the second tapered surface.

4. The flowline connector assembly of claim 1, wherein the outer surface of the pin has a first outer diameter, and wherein a second portion of the pin proximate to a first end of the pin to be inserted into the first cylindrical passageway has a second outer diameter that is less than the first outer diameter.

5. The flowline connector assembly of claim 4, wherein the first cylindrical passageway includes a first portion having a first inner diameter, a second portion having a second inner diameter, and a third portion having a third inner diameter,
    wherein the first inner diameter of the first portion is approximately the same as an inner diameter of the pin,
    wherein the second inner diameter is greater than the first inner diameter of the first portion and is less than the third inner diameter of the third portion, and the second portion is configured to receive the second portion of the pin based on the second inner diameter,
    wherein the third portion is configured to receive the outer surface of the pin based on the third inner diameter, and
    wherein the first inner diameter of the first portion and the inner diameter of the pin are substantially equal to the inner diameter of the fluid passageway.

6. The flowline connector assembly of claim 1, further comprising:
    a first one or more seals located proximate to a first end of the pin that is configured to be inserted into the first cylindrical passageway configured to create a seal between an outer surface of the first end and an inner surface of the first flowline member; and
    a second one or more seals located proximate to a second end of the pin that is configured to be inserted into the second cylindrical passageway configured to create a seal between an outer surface of the second end and an inner surface of the second flowline member.

7. The flowline connector assembly of claim 1, wherein the pin includes a protective cap at a first end of the pin that is configured to be inserted into the first cylindrical passageway.

8. A flowline connector assembly, comprising:
    a first flowline member defining a first passageway;
    a second flowline member defining a second passageway;
    a pin having an annular configuration,
        wherein the pin includes a stop extending radially outward from an outer surface of the pin,
        wherein the pin is configured to be inserted into the first flowline member and the second flowline member,
        wherein a first side of the stop is configured to contact a face of the first flowline member when the pin is inserted into the first flowline member,
        wherein the pin defines a third passageway, and
        wherein, when the pin is inserted into the first flowline member and the second flowline member:
            the first passageway, the second passageway, and the third passageway together define a fluid passageway having an inner diameter that is substantially constant along a length of the flowline connector assembly from the first flowline member to the second flowline member; and
    a collar having a first inner diameter at a first end of the collar and a second inner diameter at a second end of the collar,
        wherein the collar is configured for threaded engagement at the first end with an outer surface of the first flowline member, and
        wherein an inner surface of the collar at the second end is configured to contact a second side of the stop to connect the first flowline member with the second flowline member.

9. The flowline connector assembly of claim 8, wherein the pin is connected to the first flowline member via a slip engagement or a threaded engagement, and wherein the pin is connected to the second flowline member via a threaded engagement or a welded engagement.

10. The flowline connector assembly of claim 8, wherein the outer surface of the pin has a first outer diameter, wherein a second portion of the pin proximate to a first end of the pin that is configured to be inserted into the first flowline member has a second outer diameter that is less than the first outer diameter, and wherein a second end of the pin that is configured to be inserted into the second flowline member has the first outer diameter.

11. The flowline connector assembly of claim 8, wherein the second inner diameter at the second end of the collar is greater than an outer diameter of the second flowline member.

12. The flowline connector assembly of claim 8, wherein the second inner diameter at the second end of the collar is less than an outer diameter of the second flowline member.

13. The flowline connector assembly of claim 8, wherein the collar includes one or more apertures configured for at least one of:
    receiving a tool to facilitate the collar being threaded onto the first flowline member, or
    receiving an anti-rotation pin or screw to prevent a rotation of the collar.

14. The flowline connector assembly of claim 8, wherein the pin has a length that is configured to cause a face of the second flowline member to contact the collar when the pin is inserted into the first flowline member and the second flowline member.

15. The flowline connector assembly of claim 8, wherein the pin has a length that is configured to cause a gap to be between a face of the second flowline member and the collar when the pin is inserted into the first flowline member and the second flowline member.

16. A flowline system, comprising:
    a first flowline having a cylindrical body and a first flowline member;
    a second flowline having a cylindrical body and a second flowline member; and
    a flowline connector for connecting the first flowline and the second flowline, the flowline connector comprising:
        a pin including a stop extending radially outward from an outer surface of the pin,
            wherein the pin is configured to be inserted into a first cylindrical passageway of the first flowline member and a second cylindrical passageway of the second flowline member,
            wherein the pin is integrally connected to the second cylindrical passageway of the second flowline member,
            wherein the pin defines a third cylindrical passageway, and
            wherein, when the pin is inserted into the first cylindrical passageway and the second cylindrical passageway:
                the first cylindrical passageway, the second cylindrical passageway, and the third cylindrical passageway together define a fluid passageway having an inner diameter that is substantially constant along a length of the flowline system from the first flowline member to the second flowline member; and
        a collar having a first inner diameter at a first end of the collar and a second inner diameter at a second end of the collar,
            wherein the first inner diameter is greater than the second inner diameter, wherein the collar is configured for threaded engagement at the first end with an outer surface of the first flowline member, and wherein an inner surface of the collar at the second end is configured to contact a first side of the stop to connect the first flowline with the second flowline.

17. The flowline system of claim 16, wherein a second side of the stop is configured to contact a face of the first flowline member when the pin is inserted into the first cylindrical passageway, and wherein the second side is perpendicular to the outer surface of the pin and the first side is tapered.

18. The flowline system of claim 16, wherein the first cylindrical passageway includes a first portion having a first inner diameter, a second portion having a second inner diameter, and a third portion having a third inner diameter;

wherein the second cylindrical passageway includes a first portion having the first inner diameter and a second portion having the third inner diameter; and wherein the first inner diameter is substantially equal to the inner diameter of the fluid passageway.

19. The flowline system of claim 16, wherein the flowline connector further comprises:

a first one or more seals located proximate to a first end of the pin that is configured to be inserted into the first cylindrical passageway; and a second one or more seals located proximate to a second end of the pin that is configured to be inserted into the second cylindrical passageway.

20. The flowline system of claim 16, wherein the outer surface of the pin has a first outer diameter, and wherein a second portion of the pin proximate to a first end of the pin that is configured to be inserted into the first cylindrical passageway has a second outer diameter that is less than the first outer diameter.

* * * * *